US010159005B2

United States Patent
Siomina

(10) Patent No.: US 10,159,005 B2
(45) Date of Patent: *Dec. 18, 2018

(54) METHODS FOR CONFIGURING AND PERFORMING UL MEASUREMENTS ACCOUNTING FOR LOW-ACTIVITY STATE CONFIGURATION OF THE TRANSMITTING NODE

(71) Applicant: Telefonaktiebolaget L M Ericsson (publ), Stockholm (SE)

(72) Inventor: Iana Siomina, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 236 days.

This patent is subject to a terminal disclaimer.

(21) Appl. No.: 14/358,064

(22) PCT Filed: Feb. 20, 2014

(86) PCT No.: PCT/SE2014/050206
§ 371 (c)(1),
(2) Date: May 14, 2014

(87) PCT Pub. No.: WO2014/129960
PCT Pub. Date: Aug. 28, 2014

(65) Prior Publication Data
US 2015/0223085 A1    Aug. 6, 2015

Related U.S. Application Data

(60) Provisional application No. 61/767,170, filed on Feb. 20, 2013.

(51) Int. Cl.
*H04W 24/08*    (2009.01)
*H04W 52/02*    (2009.01)
*H04W 76/28*    (2018.01)

(52) U.S. Cl.
CPC ....... *H04W 24/08* (2013.01); *H04W 52/0206* (2013.01); *H04W 52/0209* (2013.01);
(Continued)

(58) Field of Classification Search
CPC ............ H04W 24/08; H04W 52/0206; H04W 52/0209; H04W 72/04
See application file for complete search history.

(56) References Cited

U.S. PATENT DOCUMENTS

2007/0291729 A1    12/2007  Dalsgaard et al.
2008/0151797 A1     6/2008  Camp
(Continued)

FOREIGN PATENT DOCUMENTS

WO    2008076485 A1    6/2008
WO    2012173561 A2   12/2012

*Primary Examiner* — Wei Zhao
(74) *Attorney, Agent, or Firm* — Coats & Bennett, PLLC

(57) ABSTRACT

A system and method (40, 50, 70, 80) for meeting a pre-defined requirement for uplink (UL) measurements when low-activity state configuration, and for allowing a node to adapt or adjust the UL signals, is disclosed. Particularly, a measuring node (30a) is configured to adapt its UL measurements responsive to obtaining information about low-activity state configuration of a transmitting node. The transmitting node (30b) is configured to adapt its UL transmission when configuring low-activity states to comply with the pre-defined requirement or rule. A configuring node (30c) initiates configuring the UL radio signal transmissions for the transmitting node, and adaptively configures the low-activity state configuration and/or the UL radio signal configuration for the transmitting node.

14 Claims, 21 Drawing Sheets

(52) U.S. Cl.
CPC ....... *H04W 52/0229* (2013.01); *H04W 76/28*
(2018.02); *H04W 52/0216* (2013.01); *Y02D*
*70/00* (2018.01); *Y02D 70/1242* (2018.01);
*Y02D 70/1262* (2018.01); *Y02D 70/1264*
(2018.01); *Y02D 70/142* (2018.01); *Y02D*
*70/146* (2018.01); *Y02D 70/164* (2018.01);
*Y02D 70/22* (2018.01); *Y02D 70/24* (2018.01);
*Y02D 70/25* (2018.01)

(56) References Cited

U.S. PATENT DOCUMENTS

| | | | |
|---|---|---|---|
| 2008/0151812 A1 | 6/2008 | Camp, Jr. et al. | |
| 2010/0015984 A1* | 1/2010 | Kazmi | H04W 36/0088 |
| | | | 455/437 |
| 2010/0130137 A1* | 5/2010 | Pelletier | H04W 72/04 |
| | | | 455/68 |
| 2010/0130214 A1* | 5/2010 | Ahluwalia | H04W 76/28 |
| | | | 455/450 |
| 2012/0163192 A1 | 6/2012 | Bae | |

* cited by examiner

METHODS FOR CONFIGURING AND PERFORMING UL MEASUREMENTS ACCOUNTING FOR LOW-ACTIVITY STATE CONFIGURATION OF THE TRANSMITTING NODE

TECHNICAL FIELD

The present disclosure relates generally to wireless communication networks, and in particular, to such networks where a first radio node performs radio measurements based on transmissions from a second radio node.

BACKGROUND

General Principles of Discontinuous Reception (DRX)

In LTE, Discontinuous Reception (DRX) has been introduced as one of the key solutions to conserve battery power in mobile terminals. DRX is characterized by a per User Equipment (UE) mechanism, as opposed to a per radio bearer mechanism, and may be used in both the RRC_IDLE and RRC_CONNECTED modes. In the RRC_CONNECTED mode, an eNodeB or a UE may initiate the DRX mode when there are no outstanding or new packets to be transmitted or received. In the RRC_IDLE mode, both 2G and 3G terminals may use discontinuous reception while in an idle state to increase the life time of the battery. Additionally, both High Speed Packet Access (HSPA) and Long Term Evolution (LTE) standards have introduced DRX for the connected state.

Further characterizing DRX is that available DRX values are controlled by the network and start from non-DRX up to n seconds. Additionally, Hybrid Automatic Repeat Request (HARQ) operations related to data transmission are independent of DRX operation, and the UE may wake to read the Physical Downlink Control Channel (PDCCH) for possible retransmissions and/or ACK/NAK signaling regardless of DRX. On the downlink, a timer is used to limit the time the UE remains awake waiting for a retransmission.

When DRX is configured, the UE may be further configured with an "on-duration" timer during which the UE monitors the PDCCHs for possible allocations. Additionally, when DRX is configured, periodic CQI reports can only be sent by the UE during the "active-time." Radio Resource Control (RRC) can further restrict periodic Channel Quality Indicator (CQI) reports so that they are only sent during the "on-duration" period. Moreover, the eNodeB does not transmit packets to UE during the sleep mode.

DRX in the RRC_CONNECTED mode should not be confused with DRX in RRC_IDLE mode, which the mobile terminal enters after a prolonged time of air interface inactivity. DRX in the RRC_IDLE mode is also known as paging DRX—i.e., the time the UE can enter a sleep state between two paging messages that could contain a command for the UE to wake and switch back to the RRC_CONNECTED mode. This DRX in the RRC_IDLE mode is much less fine grained and measured in hundreds of milliseconds or even seconds.

Parameters Related to DRX

The following definitions apply to DRX in Evolved Universal Mobile Telecommunications System (UMTS) Terrestrial Radio Access Network (E-UTRAN).

On-duration: The On-duration parameter defines the duration in downlink subframes that the UE waits for, after waking up from DRX, to receive PDCCHs. If the UE successfully decodes a PDCCH, the UE remains awake and starts an inactivity timer.

Inactivity-timer: The inactivity-timer is a timer that defines the duration in downlink subframes that the UE waits to successfully decode a PDCCH beginning from the last successful decoding of a PDCCH. Upon failing to decode a PDDCH, the UE re-enters DRX. The UE restarts the inactivity timer following a single successful decoding of a PDCCH for a first transmission only (i.e., not for retransmissions).

Active-time: The active-time defines the total duration that the UE is awake. This includes the "on-duration" period of the DRX cycle, the time UE is performing continuous reception while the inactivity-timer has not expired, and the time UE is performing continuous reception while waiting for a downlink (DL) retransmission after one HARQ Round Trip Time (RTT). Based on the above, the minimum duration of the active-time is equal to the on-duration period, and the maximum duration is undefined (infinite).

Of the foregoing parameters, both the on-duration and inactivity-timers have fixed length durations, while the active-time has a varying length duration that is based on scheduling decisions and on whether the UE successfully decodes the PDCCH. Further, only the on-duration and inactivity-timer durations are signaled to the UE by the eNodeB. There is only one DRX configuration applied in the UE at any time, and the UE shall apply an on-duration upon waking from the DRX sleep state.

FIG. 1 is a chart 10 that illustrates the DRX mode in LTE. The DRX mode is triggered by means of an inactivity timer, known as the drx-InactivityTimer. As can be seen from FIG. 1, the UE activity time may be extended if the PDCCH is received during the on-duration time 14. However, the UE activity time may also be shortened by a MAC DRX command, upon reception of which the UE stops the onDurationTimer and the drx-InactivityTimer.

If the PDCCH has not been successfully decoded during the on-duration time, the UE shall follow the DRX configuration (i.e., the UE can enter DRX sleep if allowed by the DRX configuration). This applies also for the sub-frames where the UE has been allocated predefined resources. Further, if the UE successfully decodes a PDCCH for a first transmission, the UE shall remain awake and start the inactivity timer 12 even if a PDCCH is successfully decoded in the sub-frames where the UE has also been allocated predefined resources. The UE remains awake until a MAC control message tells the UE to re-enter DRX, or until the inactivity timer expires 16. In both cases, the DRX cycle that the UE follows after re-entering DRX is given by the following rules.

If a short DRX cycle is configured, the UE first follows the short DRX cycle, and then a long DRX cycle after a longer period of inactivity. If a short DRX cycle is used, the long cycle will be a multiple of the short cycle. Further, the durations for the long and short DRX cycles are configured by the RRC. The transition between the short and long DRX cycles may be determined by the UE based on an activity timer, or by the eNodeB MAC commands. Particularly, if the eNodeB MAC command is received and short DRX is configured, the UE will (re)start the drxShortCycleTimer and use the Short DRX Cycle. Otherwise, the long DRX will be used. However, if a short DRX cycle is not configured, the UE follows the long DRX cycle directly.

Some of the parameters that may be configured by the network include, but are not limited to:
- The onDurationTimer, which is measured in PDCCH subframes, can have a value of: 1, 2, 3, 4, 5, 6, 8, 10, 20, 30, 40, 50, 60, 80, 100, or 200 PDCCH subframes;
- The drx-InactivityTimer, which is also measured in PDCCH subframes, can be 1, 2, 3, 4, 5, 6, 8, 10, 20, 30, 40, 50, 60, 80, 100, 200, 300, 500, 750, 1280, 1920, or 2560 PDCCH subframes. A specific value may also be configured if the UE supports in-device co-existence (IDC);
- The longDRX-CycleStartOffset, which is measured in subframes, depends on the cycle length, but can have a value up to 2559 subframes; and
- The shortDRX-cycle, which is also measured in subframes, can have a value of 2, 5, 8, 10, 16, 20, 32, 40, 64, 80, 128, 160, 256, 320, 52, or 640 subframes.

UE Active Time and UE Transmissions When Using DRX

When a DRX cycle is configured, the active-time includes the time while:
- the onDurationTimer, the drx-InactivityTimer, the drx-RetransmissionTimer, or the mac-ContentionResolutionTimer is running; or
- a Scheduling Request is sent on the Physical Uplink Control CHannel (PUCCH) and is pending; or
- an uplink grant for a pending HARQ retransmission can occur and there is data in the corresponding HARQ buffer; or
- a PDCCH indicating a new transmission addressed to the Cell Radio Network Temporary Identifier (C-RNTI) of the UE has not been received after successful reception of a Random Access Response (RAR) message for the preamble not selected by the UE.

Generally, new transmissions can only take place during the active time so that when the UE is waiting for one retransmission only, the UE does not have to be "awake" during the RTT. When not in active-time, type-0-triggered Sounding Reference Signals (SRS) shall not be reported.

If CQI masking (cqi-Mask) is setup by the upper layers, CQI/PMI/RI/PTI on PUCCH shall not be reported when onDurationTimer is not running. Otherwise, CQI/PMI/RI/PTI on PUCCH shall not be reported when not in active time. That is, cqi-Mask effectively limits the CQI/PMI/PTI/RI reports to the on-duration period of the DRX cycle, and the same, single value applies for all serving cells. That is, the associated functionality is common—i.e., not performed independently for each cell.

However, there are a few exceptions. Particularly, regardless of whether the UE is or is not monitoring the PDCCH, the UE receives and transmits HARQ feedback and transmits type-1-triggered SRS when such is expected.

In another exception, a UE may optionally choose to forego sending CQI/PMI/RI/PTI reports on the PUCCH and/or type-0-triggered SRS transmissions for up to 4 subframes following a PDCCH indication that a new uplink (UL) or downlink (DL) transmission was received in subframe n-i, wherein n is the last subframe of the active-time and i is an integer value from 0 to 3. After the active-time is stopped due to the reception of a PDCCH or a MAC control element, a UE may optionally choose to continue sending CQI/PMI/RI/PTI reports on the PUCCH and/or SRS transmissions for up to 4 subframes. The choice to not send CQI/PMI/RI/PTI reports on the PUCCH and/or type-0-triggered SRS transmissions is not applicable for subframes where the onDurationTimer is running, and is not applicable for subframes n-i to n.

Uplink (UL) Radio Measurements

As defined herein, a UL measurement is a measurement performed at least on a signal transmitted by a wireless device. Some examples of UL measurements are measurements performed by the eNodeB or by an LMU (see e.g., "Evolved Universal Terrestrial Radio Access (E-UTRA); Physical layer; Measurements," 3GPP TS 36.214 v. 11.1.0 Release 11). Other examples are measurements on a wireless device transmission in a device-to-device communication. In another example, a radio network node may also transmit over the UL, such as, for example, a relay station or a radio network node equipped with a UE-like interface (e.g., a femto BS).

An UL measurement may be, for example, a received signal strength or signal quality measurement, a timing measurement, or angle measurement. Further, a given UL measurement may be absolute, relative to a common reference or another measurement, or composite measurement. An UL measurement may also involve measurements on one or more links, which may be between the same two nodes (e.g., UL RTOA based on SRS) or between different nodes (e.g., on multifarious links, such as described in PCT/SE2012/050644 entitled, "Methods of Configuring Enhanced Timing Measurements Involving Multifarious Links" and filed on Jun. 13, 2012). A UL measurement may also be two-directional (e.g., eNodeB Rx-Tx, RTT, etc.).

UL measurements may be performed for different purposes. By way of example only, such purposes may include, but are not limited to:
- Radio Resource Management (RRM);
- Interference Coordination;
- Positioning (e.g., Uplink-Time Difference of Arrival (U-TDOA) positioning or Enhanced Cell ID (E-CID) positioning);
- Minimization of Drive Tests (MDT);
- Self-Optimized Network (SON);
- Timing control, timing advance; and
- Synchronization Generally, UL measurements, as described herein, are performed on UL transmissions, or more generally, signals transmitted by a wireless device or radio node. Such signals comprise, for example, physical signals (i.e., a signal that is used by the physical layer but does not carry information originating from higher layers), reference signals (e.g., demodulation reference signals for Physical Uplink Shared Channel (PUSCH) or PUCCH), Sounding Reference Signals (SRS), or channels transmitted by a wireless device (e.g., Physical Random Access Channel (PRACH)).

The UL transmissions are typically configured or scheduled by a network node, for example, by means of control channels, higher-layer signalling, or a combination thereof. By way of example only, the 3GPP Technical Specification entitled "Evolved Universal Terrestrial Radio Access (E-UTRA); Physical Layer Procedures," 3GPP TS 36.213 v. 11.1.0 Release 11) identifies two types of SRS. These are:
- Type 0 SRS, which is triggered by trigger type 0 (higher layer signalling); and
- Type 1 SRS, which is triggered by trigger type 1 (i.e., triggering by control channels such as PDCCH and ePDCCH; DCI formats 0/4/1A for FDD and TDD, and DCI formats 2B/2C/2D for TDD are used for this trigger type).

Additionally, both trigger type 0 and trigger type 1 SRS transmissions may be configured. If both SRS types would occur in the same subframe in the same serving cell, the UE shall only transmit the trigger type 1 SRS transmission.

A UE may be configured with SRS parameters for trigger type 0 and trigger type 1 on each serving cell. The parameters may be serving-cell specific or UE specific, semi-statically configurable by higher layers, or dynamically configurable. Further, periodic SRSs are used for positioning, for example. SRS periodicity depends on the SRS type:

SRS type 0: 2, 5, 10, 20, 40, 80, 160, or 320 ms;
SRS type 1: 2, 5, or 10 ms.

Positioning

The possibility for determining the position of a mobile device has enabled application developers and wireless network operators to provide location based, and location aware, services. Examples of those are guiding systems, shopping assistance, friend finder, presence services, community and communication services and other information services giving the mobile user information about their surroundings.

In addition to these commercial services, the governments of several countries currently require network operators to be able to determine the position of a device placing an emergency call. For instance, government regulations in the United States (i.e., FCC E911) require that network operators be able to determine the position of a specified percentage of all emergency calls. The requirements do not distinguish between calls placed in an indoor or outdoor environment.

In many environments, the position of a UE can be accurately estimated using on Global Positioning System (GPS). However, GPS-based positioning may often have unsatisfactory performance in some environments, such as urban and/or indoor environments, for example. Therefore, complementary positioning methods may be provided by a wireless network. By way of example only, the following methods are available in the LTE standard for both the control plane and the user plane, in addition to the Global Navigation Satellite Systems (GNSS) methods, which includes GPS.

Cell-ID (CID)—a basic positioning method exploiting one or more cell IDs;

Enhanced Cell-ID (E-CID), including network-based Angle of Arrival (AoA) and Adaptive Enhanced Cell-ID (AECID)—these methods exploit various UL and/or DL measurements, and include, but are not limited to, techniques such as UE Rx-Tx time difference, eNodeB Rx-Tx time difference, LTE Reference Signal Received Power (RSRP) or Reference Signal Received Quality (RSRQ), HSPA Common Pilot Channel (CPICH) measurements, and AoA;

Assisted GNSS (A-GNSS), including Assisted GPS (A-GPS)—these methods exploit timing measurements performed on satellite signals;

Observed Time Difference of Arrival (OTDOA)—a method that uses timing measurements (e.g., Reference Signal Time Difference (RSTD) in LTE) performed by the UE on the DL radio signals transmitted by different eNodeBs, for example, for determining the UE position;

UL Time Difference of Arrival (UTDOA)—this method, which is currently being standardized, uses timing measurements (e.g., Uplink Relative Time of Arrival (UL RTOA) in LTE) performed, by eNodeBs or LMUs, for example, on UL radio signals transmitted by a UE for determining the UE position.

Additionally, TDOA-/TOA-based methods, such as Observed Time Difference of Arrival (OTDOA), Uplink Time Difference of Arrival (UTDOA), or GNSS/A-GNSS, for example, typically provide the results in a specified format—i.e., an ellipsoid point with an uncertainty circle/ellipse/ellipsoid, which is the result of intersection of multiple hyperbolas/hyperbolic arcs (e.g. OTDOA) or circles/arcs (e.g. UTDOA, GNSS, or A-GNSS).

Hybrid methods—a hybrid method typically comprises a combination of different positioning methods and/or measurements or results thereof. Since the hybrid technique may involve a mix of any of the methods above, the positioning result can be any shape, but in many cases it is likely to be a polygon.

Cellular positioning methods rely on knowledge of anchor nodes' locations, e.g., eNodeB or beacon device locations for OTDOA, LMU antenna locations for UTDOA, and eNodeB locations for E-CID. The anchor nodes' location may also be used to enhance AECID, hybrid positioning, etc.

Positioning Architecture in LTE

The three key network elements in an LTE positioning architecture are the LoCation Service Client (LCS) Client, the LCS Target, and the LCS Server. The LCS Server is a physical or logical entity that manages the positioning for a LCS Target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in a network node, an external node, a Public Safety Answering Point (PSAP), a UE, a radio base station, or in the LCS Targets themselves, for example. An LCS Client (e.g., an external LCS Client) sends a request to LCS Server (e.g., positioning node) to obtain location information. Upon receipt, the LCS Server processes and serves the received requests and sends the positioning result, and optionally a velocity estimate, to the LCS Client.

Position calculation can be conducted, for example, by a positioning server (e.g., an Evolved Serving Mobile Location Centre (E-SMLC) or Secure User Plane Location (SUPL) Location Platform (SLP) in LTE), or by the UE. The latter corresponds to the UE-based positioning mode, whilst the former may be network-based positioning (i.e., a calculation in a network node based on measurements collected from network nodes such as LMUs or eNodeBs), a UE-assisted positioning (i.e., the calculation is performed in a network-based positioning node based on measurements received from UE), or an LMU-assisted positioning (i.e., where positioning calculations are performed in a network-based positioning node based on measurements received from LMUs), etc.

FIG. 2 illustrates the UTDOA architecture 20 being currently discussed in 3GPP. Although UL measurements may in principle be performed by any radio network node (e.g., eNodeB), UL positioning architecture 20 may include specific UL measurement units (e.g., LMUs), which may be, for example, logical and/or physical nodes, integrated with radio base stations or sharing some of the software or hardware equipment with radio base stations, or may be standalone nodes with their own equipment, including antennas. The UTDOA architecture 20 is not finalized yet, but there may be communication protocols between an LMU and a positioning node, and there may be some enhancements for LTE Positioning Protocol A (LPPa) or similar protocols to support UL positioning.

As seen in FIG. 2, a new interface, i.e., "SLm," between the E-SMLC and the LMU, is being standardized for uplink positioning. The interface is terminated between a positioning server, such as the E-SMLC, and the LMU. The SLm is used to transport SLmAP protocol messages, which is a new protocol being specified for UL positioning, over the E-SMLC-to-LMU interface. Several LMU deployment options are possible. For example, as seen in FIG. 2, an LMU may be a standalone physical node, or it may be integrated into an eNodeB, or it may be sharing at least some equipment, such as antennas, with eNodeB.

LPPa is a protocol between the eNodeB and the LCS Server specified only for control-plane positioning procedures, although it still can assist user-plane positioning by querying eNodeBs for information and eNodeB measurements. LPPa may be used for DL positioning and UL positioning.

In LTE, UTDOA measurements, UL RTOA, are performed on SRS. To detect an SRS, the LMU needs a number of SRS parameters to generate the SRS sequence, which is to be correlated to received signals. The SRS parameters used for generating the SRS sequence and determining when SRS transmissions occur may be provided in the assistance data transmitted by the positioning node to the LMU. This assistance data could be provided via SLm interface Application Protocol (SLmAP). However, these parameters may generally be not known to the positioning node, which needs them to obtain this information from the eNodeB that is configuring the SRS to be transmitted by the UE and measured by LMU. Such information would have to be provided in LPPa by eNodeB to E-SMLC.

SUMMARY

Embodiments of the present disclosure provide a system and method of meeting a pre-defined requirement for UL measurement when low-activity state configuration is used. Additionally, embodiments of the present disclosure provide a method for allowing a node to adapt or adjust UL signals.

More particularly, in one embodiment, a measuring node is configured to adapt its UL measurements responsive to the information about low-activity state configuration of the transmitting node. In this embodiment, the measuring node first obtains information about the low-activity state of the transmitting node. The measuring node then uses the obtained information to perform at least one UL measurement involving measuring on UL radio signals transmitted by a transmitting node. Optionally, the measuring node may report the measurement to another node.

Obtaining information about the low-activity state of the transmitting node may comprise, for example, determining whether the UL transmissions, relevant for the concerned UL measurements, are or are not impacted by a low-activity state configuration. Such a determination may be based on, for example, a pre-defined rule or requirement, a transmitting node configuration, or a used low-activity state configuration.

In another embodiment, obtaining information about the low-activity state of the transmitting node comprises receiving the information, explicitly or implicitly, from another node or via cross-layer communication. For example, in one embodiment, the measuring node receives an indication of whether a specified type of UL radio signals may not be transmitted, even when configured, due to low-activity periods. In another embodiment, the indication indicates whether the specified type of UL radio signals are always transmitted as configured, and further, indicates a transmitting node's capability to always transmit a specified type of UL signals, or at least to ensure a certain number of UL radio signal transmissions, regardless of whether low-activity states are used.

In another embodiment, obtaining information about the low-activity state of the transmitting node comprises receiving other information, such as the actual low-activity state configuration of the transmitting node, or one or more possible low-activity state configurations of the transmitting node, or a common low-activity configuration of the transmitting node that may be used by a group of wireless devices or all wireless devices in a cell.

In one embodiment, obtaining information about the low-activity state of the transmitting node comprises receiving a pattern or map indicative of a subset of the configured signals and/or time instances that are transmitted by the transmitting node, even if the transmitting node may be generally using a low-activity state configuration.

In another embodiment, obtaining information about the low-activity state of the transmitting node comprises receiving DL and/or UL data or measurement scheduling information associated with the activity of the transmitting node.

In another embodiment, obtaining information about the low-activity state of the transmitting node comprises receiving the information via one or more direct or logical connections.

In another embodiment, obtaining the information about the low-activity state of the transmitting node comprises discovering the information based on measurements and/or measurement reports associated with the transmitting node.

In another embodiment, obtaining the information about the low-activity state of the transmitting node comprises autonomously discovering the low-activity state of the transmitting node by detecting the configured radio signals transmitted by the transmitting node.

In an embodiment, the method further comprises assuming that the received UL signal configuration already accounts for the low-activity states.

In another embodiment, the measuring node, based on the obtained information, performs at least one UL measurement by measuring radio signals transmitted by the transmitted node.

In another embodiment, the measuring node performs UL measurements differently depending on whether the transmitting node is using a low-activity state configuration. To accomplish this, the measuring node may, in one embodiment, extend the measurement time when the transmitting node is using a low-activity state configuration. Additionally or alternatively, the measuring node may adapt at least one of a measuring procedure, a measurement configuration, or measurement reporting, when using low-activity configuration.

In another embodiment, the measuring node may combine UL radio signal transmissions of different types, responsive to the information about the low-activity states.

In another embodiment, the method may further comprise applying a correction to the measurement to account for the transmitting node being in a low-activity state, or to account for a specific low-activity state configuration.

In another embodiment, a transmitting node is configured to adapt its UL transmission when configuring low-activity states to comply with a pre-defined requirement or rule. In this embodiment, the transmitting node first obtains, optionally, a request or a configuration for UL radio signal transmission. The transmitting node then obtains the information about its low-activity state configuration. The transmitting node may then adapt the low-activity state configuration when UL radio signals are to be transmitted and measured by a measuring node for a specific purpose and/or meeting a specific requirement, and utilizes the low-activity state configuration and adapting UL radio signal configuration, responsive to UL measurement requirement. The transmitting node then transmits the UL radio signal using the adapted UL transmission configuration.

To obtain the request or configuration, as well as the information about the low-activity state configuration, the transmitting node may, in one embodiment, receive one or more low-activity state configurations from another node (e.g., from a serving eNodeB), acquire a pre-configured configuration from a local database or memory, and/or decide itself or adapt at least one parameter characterizing its low-activity state configuration.

In another embodiment, the obtained or adapted parameter may comprise one or more of an active state duration, an active state periodicity, a usage of short intermediate cycles, a configuration of short cycles, an offset or a reference time point for a timer controlling low-activity state configuration, a configurable set of UL radio signal transmission triggers, and a configurable set of UL signals that may be transmitted during the inactive state.

In one embodiment, adapting the low-activity state configuration comprises at least one of extending the active time, increasing the active state periodicity, and configuring shorter intermediate cycles.

In another embodiment, adapting the low-activity state configuration may be autonomously performed by the transmitting node and/or with or without assistance from the configuring node.

In another embodiment, adapting the low-activity state configuration is performed according to a pre-defined rule.

In one embodiment, determining whether to use the UL radio signal configuration is based on at least one of a number of transmissions, a periodicity, a bandwidth, and exact time-frequency resources.

In one embodiment, adapting the UL radio signal configuration comprises transmitting a certain number or portion of configured UL radio signals, regardless of whether low-activity state configuration is utilized.

In another embodiment, the transmitting node may transmit all or more of the UL radio signals when the measuring node is not aware of the low-activity state and/or of the related behavior of the transmitting node, compared to when the measuring node is aware of the low-activity state and/or of the related behavior of the transmitting node.

Embodiments of the present disclosure further provide a configuring node configured to send a desired, recommended, or requested configuration to another configuration node. More particularly, in one embodiment, a first configuring node initiates configuring the UL radio signal transmissions for a transmitting node, and adaptively configures the low-activity state configuration and/or the UL radio signal configuration for the transmitting node. Optionally, the first configuring node sends the low-activity state configuration and/or the UL radio signal configuration/scheduling for the first transmitting node to a second node.

In one embodiment, initiating configuring the UL radio signal transmissions is performed responsive to receiving a request for UL radio signal transmissions from another node, or upon detecting a triggering event, or upon detecting a triggering condition, or upon receiving an indication from a higher layer.

In another embodiment, initiating configuring the UL radio signal transmissions comprises obtaining the indication in the request from another node, or from the higher layer, or based on the type of initiation or the trigger.

In one embodiment, the indication is obtained explicitly or implicitly, and comprises a purpose for the UL radio signals, a desired configuration of UL radio signals, a distance or location of the measuring node, radio environment characteristics, or interference at the measuring node.

In one embodiment, the configuring node is an eNodeB and the measuring node is another eNodeB or LMU, and the method further comprises receiving a request from another eNodeB or from a positioning node.

In one embodiment, adaptively configuring the low-activity state configuration and/or the UL radio signal configuration comprises configuring the low-activity state configuration and/or UL radio signal configuration adaptively responsive to the indication received during the initiation step.

In another embodiment, adaptively configuring the low-activity state configuration and/or the UL radio signal configuration comprises performing the adaptation to a predetermined requirement, or a rule that is to be satisfied for the UL measurement performed based on the UL radio signals.

In one embodiment, to adaptively configure the low-activity state configuration and/or the UL radio signal configuration, the method adapts the active time duration.

In another embodiment, the method calls for selecting and configuring a first set of UL radio signals when the low-activity state configuration is used. However, when the low-activity state configuration is not used, the method calls for selecting a second set of UL radio signals.

In one embodiment, the method calls for the configuring node to configure a second trigger type. In one particular embodiment, the second trigger triggers the UL radio signals in the set of UL radio signals which would otherwise be triggered by a first trigger.

In another embodiment, the method recites configuring a second set of UL radio signals to complement the first set of UL radio signals to increase the probability that the configured UL radio signals are actually transmitted by the transmitting node.

In another embodiment, the second set of UL radio signals comprises at least one parameter that is the same as a parameter in the first set of UL radio signals.

In another embodiment, the method calls for configuring or triggering the transmitting node to change the state to active responsive to a periodic UL radio signal to increase the number of UL radio signal transmissions. In this embodiment, the configuration/triggering of the state change is performed via an additional transmission in the DL that is monitored or received by the transmitting node.

In another embodiment, the method further comprises aligning active states or ON states with a configured UL radio signal to ensure that the number of UL radio signals within the active or ON states are above a threshold.

In addition to the foregoing, the present disclosure also provides a method for adjusting the UL signal configuration to incorporate the low-activity state configuration necessary for UL measurements. More particularly, in one embodiment, a first node obtains a first UL signal configuration and low-activity state information for a transmitting node. Once the configuration and information has been obtained, the method further calls for the first node adjusting the UL signal configuration while accounting for the low-activity information of a transmitting node, and obtaining a second UL signal configuration that incorporates the low-activity state configuration necessary for UL measurements. Thereafter, the method calls for storing or sending the second UL signal configuration to a second node.

In one embodiment, adjusting the first UL signal configuration while accounting for low-activity information of a transmitting node comprises determining the configured UL signals that may be not transmitted due to a low-activity state configuration, and determining a new UL signal configuration that excludes or reduces the number of determined UL signals that may be not transmitted.

In another embodiment, adjusting the first UL signal configuration while accounting for low-activity information of a transmitting node comprises one or more of increasing the periodicity of configured UL signals, decreasing the density of configured UL signals per time interval, and including a mask to remove the UL signals that have not been transmitted, in the new UL signal configuration.

Of course, those skilled in the art will appreciate that the present invention is not limited to the above contexts or examples, and will recognize additional features and advantages upon reading the following detailed description and upon viewing the accompanying drawings.

DETAILED DESCRIPTION

Aspects of the present disclosure are discussed in the following paragraphs using certain terms and phrases that are defined and explained below. For example, the terms "wireless device" and "UE" are used interchangeably throughout the following description. As defined herein, a UE may comprise any device equipped with a radio interface and that is capable of at least generating and transmitting a radio signal to a radio network node. Note that even some radio network nodes, such as a femto BS (also referred to as a "home BS"), for example, may also be equipped with a UE-like interface. Some examples of a "UE" that are to be understood in a general sense are a Personal Digital Assistant (PDA), a laptop computing device, a mobile terminal, a sensor, a fixed relay, a mobile relay, or any radio network node equipped with a UE-like interface (e.g., small RBS, eNodeB, femto BS).

Additionally, a "radio node" is defined herein as a device characterized by its ability to transmit and/or receive radio signals, and comprises at least a transmitting or a receiving antenna. A radio node may be a UE or a radio network node. Some examples of radio nodes are a radio base station (e.g., eNodeB in LTE or NodeB in UTRAN), a relay, a mobile relay, a remote radio unit (RRU), a remote radio head (RRH), a sensor, a beacon device, a measurement unit (e.g., LMUs), a user terminal, a PDA, a mobile terminal, a cellular device such as an iPhone, and a laptop computing device, for example.

Figure 1:
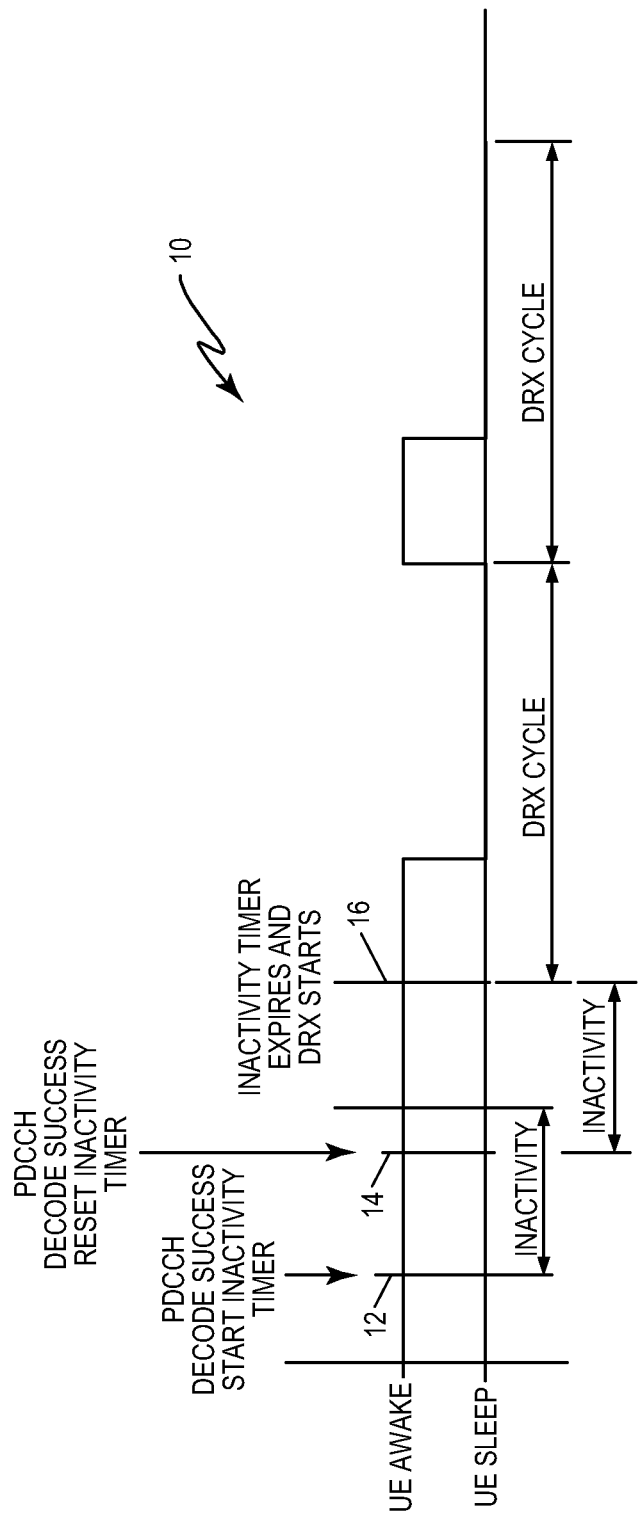
FIG. 1 is a timing diagram illustrating timer states for DRX mode in LTE.
Figure 2:
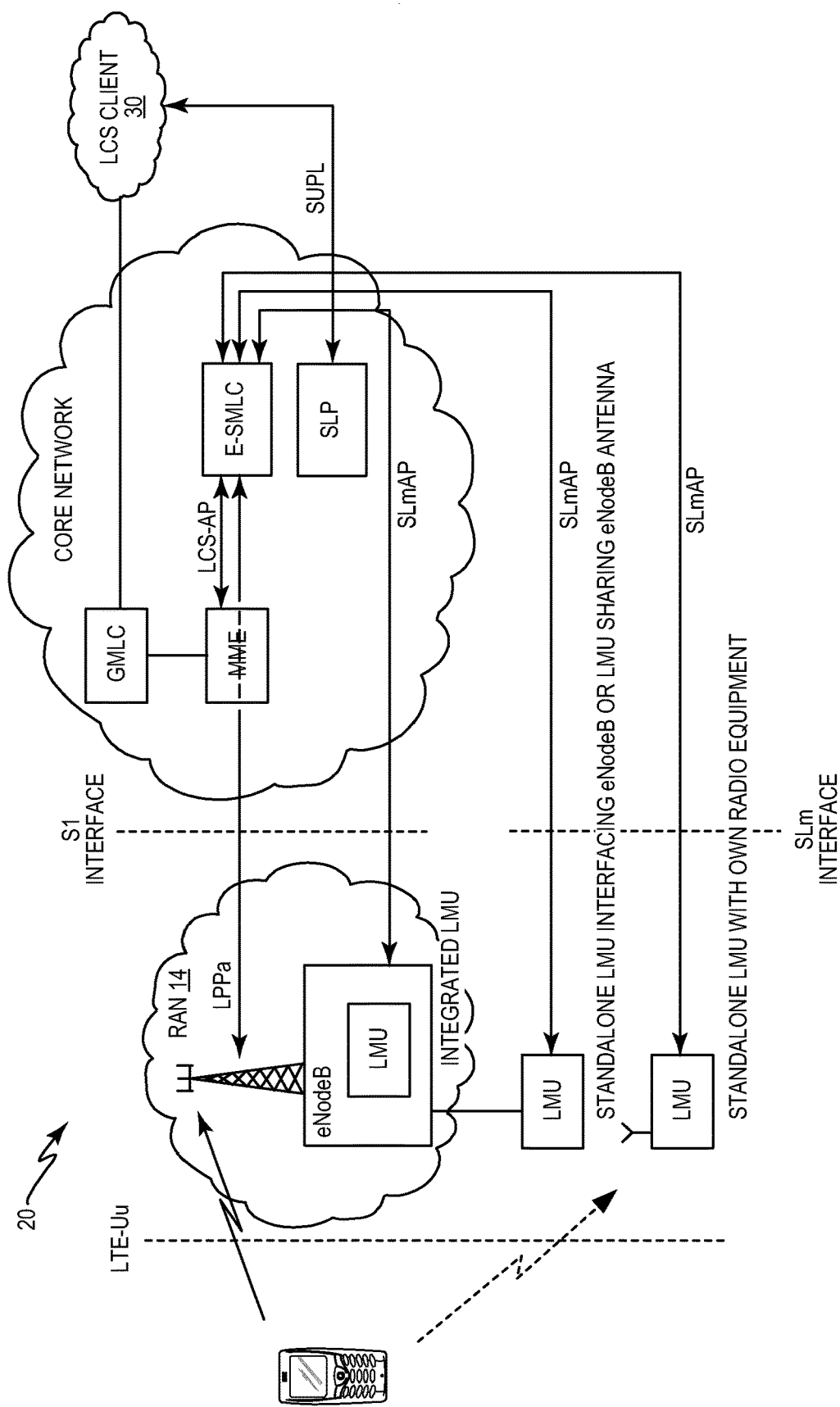
FIG. 2 is a block diagram illustrating a UL positioning architecture in LTE according to one embodiment.
Figure 3:
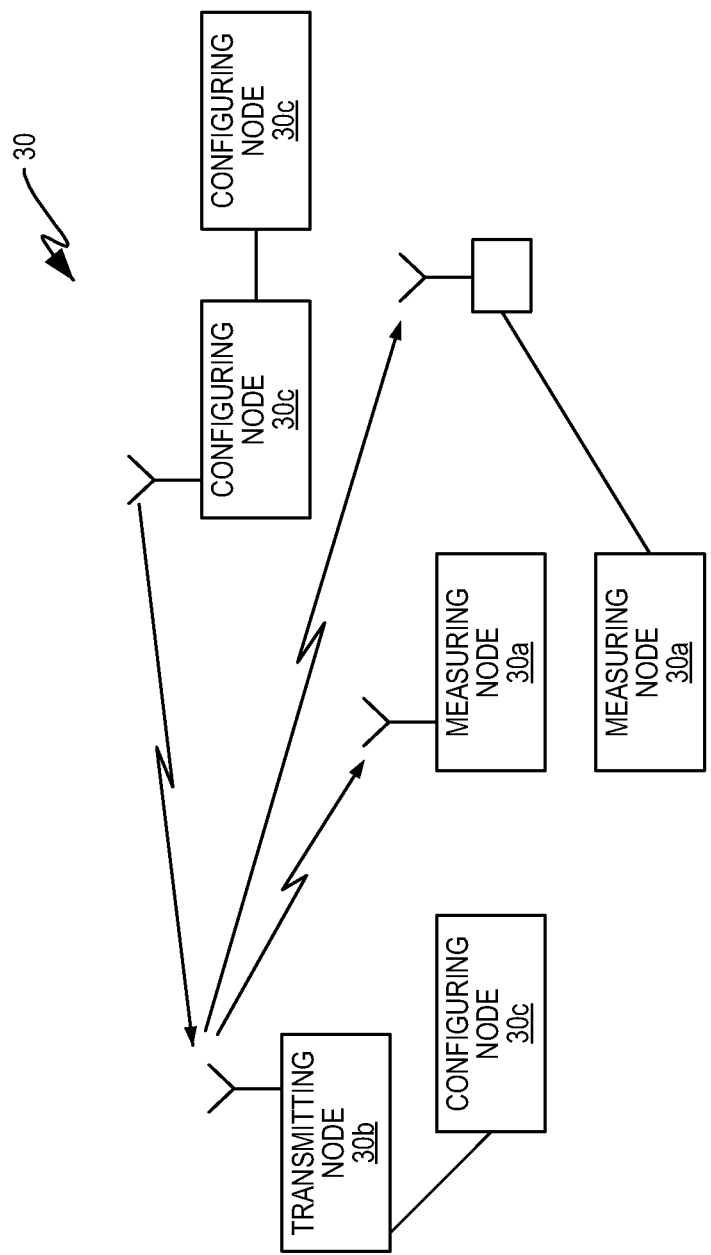
FIG. 3 is a block diagram illustrating some of nodes that may be configured according to one or more embodiments.

FIG. 3 illustrates some nodes 30 that may be configured to function according to one or more embodiments of the present disclosure. Particularly, "measuring nodes" 30a are radio nodes performing signals on radio signals. Depending on the embodiments, a measuring node 30a may perform measurements on DL signals (e.g., a wireless device or a radio network node equipped with a UE-like interface, relay, etc.) or UL signals (e.g., a radio network node in general, eNodeB, WLAN access point, LMU, etc.).

A "radio network node" is a radio node comprised in a radio communications network and is typically characterized by having its own network address or an associated network address. For example, a mobile terminal in a cellular network may have no network address, but a wireless device involved in an ad hoc network is likely to have a network address. A radio node may be capable of operating or receiving radio signals or transmitting radio signals in one or more frequencies, and may operate in a single Radio Access Technology (single-RAT), multi-RAT, or multi-standard mode (e.g., a dual-mode UE configured to operate with any one or combination of WiFi and LTE or HSPA and LTE/LTE-A). A radio network node, which includes an eNodeB, an RRH, an RRU, or other transmitting-only/ receiving-only nodes, may or may not create its own cell, and may comprise, in some embodiments, a transmitter and/or a receiver and/or one or more transmit antennas and/or one more receive antennas. A radio network node may also share a cell with another radio node which creates own cell. More than one cell may be associated with one radio node. Further, one or more serving cells (in DL and/or UL) may be configured for a UE, such as, for example, in a carrier aggregation system where a UE may have one Primary Cell (PCell) and one or more Secondary Cells (SCells).

A "network node" may be any radio network node or core network node. Some non-limiting examples of a network node are an eNodeB, a Radio Network Controller (RNC), a positioning node, a Mobility Management Entity (MME), a PSAP, a SON node, an MDT node, (typically but not necessarily) a coordinating node, and O&M node.

A "positioning node," as described in different embodiments, is a node with positioning functionality. For example, for LTE, a "positioning node" may be understood to comprise a positioning platform in the user plane (e.g., SLP in LTE) or a positioning node in the control plane (e.g., E-SMLC in LTE). SLP may also consist of SLC and SUPL Positioning Center (SPC). The SPC may also have a proprietary interface with E-SMLC. Positioning functionality may also be split among two or more nodes. For example, there may be a gateway node between LMUs and E-SMLC, where the gateway node may be a radio base station or another network node. In this case, the term "positioning node" may relate to E-SMLC and the gateway node. However, in a testing environment, a positioning node may be simulated or emulated by test equipment.

A "coordinating node" is a network and/or node configured to coordinate radio resources with one or more radio nodes. Some examples of a coordinating node include a network monitoring and configuration node, an OSS node, an O&M node, an MDT node, a SON node, a positioning node, an MME, a network-based gateway node such as a Packet Data Network Gateway (P-GW) or Serving Gateway (S-GW) node or femto gateway node, a macro node configured to coordinate its associated smaller radio nodes with the macro node, an eNodeB coordinating resources with other eNodeBs, and the like.

The "signaling" described herein is performed either via direct links or logical links (e.g. via higher layer protocols and/or via one or more network and/or radio nodes). For example, signaling from a coordinating node may pass another network node, e.g., a radio network node.

The term "Secondary Cell (SCell) setup/release" used herein refers to any command, signaling message, indicator, information element (IE), control element (CE), and the like, which is sent by the network node to the carrier aggregation UE to activate, deactivate, configure or de-configure (also referred to as un-configure) one or more SCells. More specifically, SCell setup may refer to activation or configuration of an SCell, whereas SCell release may refer to deactivation or de-configuration of an SCell. The SCell can be in on the UL, the DL, or on both directions.

The embodiments of the invention are not limited to LTE, but may apply with any Radio Access Network (RAN), single- or multi-RAT. Some other RAT examples are LTE-Advanced, UMTS, HSPA, GSM, cdma2000, WiMAX, and WiFi.

Additionally, the following terms may be used interchangeably through this disclosure. For example, UL measurements used for positioning, measurements used for UL positioning, and UL positioning measurements, may comprise any radio measurement which may be performed on radio signals configured for positioning or some other purpose, and in which the measurements are used at least for positioning. The term UL positioning, at least in some embodiments, refers, for example, to UTDOA. Further, UL positioning measurements may comprise UL RTOA, but may also comprise UL TOA, UL TDOA, UL AoA, UL power-based measurements (e.g., UL received signal quality or UL received signal strength measurement), UL propagation delay, or a two-directional measurement involving an UL measurement component (e.g., RTT, eNodeB Rx-Tx or UE Rx-Tx), or any measurement in general involving at least one UL measurement component (e.g., such as a measurement on multifarious links or a composite measurement). When a measurement involves two links (e.g., TDOA, a measurement over multifarious links, RTT, or the like), the links may be between two or more nodes and/or locations (e.g., three nodes may be involved with multifarious links or TDOA, comprising two receivers or two transmitters). The term "node" herein may comprise any radio node as described above.

A UL transmission, or an UL radio signal, is generally any radio signal transmission by the wireless device. Such a transmission may be a dedicated transmission, or directed towards a specific node (e.g., eNodeB, LMU, another wireless device, relay, repeater, or the like), or a transmission, multicast, or broadcast transmission transmitted by the wireless device. In some embodiments, a UL transmission may be a peer-to-peer transmission, when the transmission is by the wireless device being positioned. Some examples of UL radio signals measured for UL positioning measurements are reference signals transmitted by the wireless device (e.g., SRS or demodulation reference signals transmitted in UL), dedicated or shared channels transmitted by the wireless device (e.g., data channels, control channels, random access channel, a broadcast channel transmitted by the wireless device, etc.), or other physical signals (e.g., transmitted by the wireless device to support device-to-device communication such as for neighbor discovery or presence/activity indication or transmitting a beacon signal/message). UL radio signals may single-shot or multi-shot radio signals; periodic, aperiodic, or a mix of periodic and aperiodic UL radio signals.

The term "UL radio signal configuration," as used herein, may refer, but is not limited, to any aspect describing the configuration of the UL radio signals. By way of example, such aspects include any one or more of a UL radio signal type, time and/or frequency resources configured for transmission, a transmission time-domain pattern, a bandwidth, a hopping configuration, parameters determining a signal sequence, a transmit power or parameters impacting the transmit power of the UL radio signal, transmit timing of the UL radio signal or timing adjustment or timing advance command, muting/no-transmission pattern of the UL radio signals, a trigger of the UL radio signal, duplex-related parameters of the UL radio signal, reference time, number of transmissions, scrambling code, associated cell (e.g., PCell), number and configuration of transmit antennas, modulation and/or coding scheme, etc. The configuration may be specific or dedicated for a "transmitting node," or it may be a common configuration, or the configuration may comprise a common set of the parameters, or the like.

As defined herein, the term "low-activity state" may refer, for example, to the configuration of low activity states and/or active states, such as DRX or DTX configurations. The term "information about low-activity state configuration," as defined herein, may refer, for example, to any one or more of:

one or more low-activity state configurations (e.g., DRX configurations) comprising any one or more parameters associated with the configurations;

a reference time or time associated with beginning of using a low-activity state configuration;

an indication of whether low-activity state configuration is used or not by the transmitting node;

an indication of whether a transition may or may not occur, as is described in more detail below, for example;

a relationship between the UL radio signal transmissions and low-state configuration, or an indication of whether the UL transmissions are impacted by possible low-activity configurations;

UL radio signal types that may be transmitted during a predetermined period when low-activity configurations are used;

Low-activity state configuration common for more than one transmitting node;

A pattern or a map indicative of a subset of the configured signals and/or time instances (e.g., subframes) that are transmitted by the transmitting node, even if the transmitting node may be generally using a low-activity state configuration;

Scheduling information of transmissions associated with active state (e.g., if set of subframes for PUSCH transmissions is known, then it is also known that the UE will be in active state and thus will be transmitting also reference signals); and Trigger types that may trigger the transmitting node to change to an active state.

Some more examples of the information about low-activity state configuration are described below in specific methods, but are generally applicable to the embodiments discussed herein.

The term "transmitting node" 30b as used herein may refer to a radio node transmitting UL radio signals, as defined above. The term "configuring node" 30c as used herein may refer to a node that configures or schedules the transmissions of a transmitting node, and/or controls the activity state of the transmitting node. The term "measuring node" 30a as used herein may refer to a node that performs one or more measurements based at least on the UL radio signals. The measuring node 30a may be equipped with its own radio antenna and radio interface, or may share one or more radio antennas with other nodes (e.g., when a measuring node 30a is co-situated with a BS and uses the BS antenna for receiving UK radio signals via radio interface).

As stated previously, radio nodes may perform measurements on radio signals transmitted by a wireless device. However, the wireless device may choose to not transmit scheduled/configured signals when in a low activity state. Another radio node performing measurements based on these transmissions, for example, based on UE's SRS in LTE, may be unaware that the UE will not transmit the configured transmissions. This may also impact the measurement time and/or measurement accuracy. Further, the low activity state (e.g., DRX) also impacts UL measurements and the related measurement configuration, such as measurement time, for example.

Therefore, in one or more embodiments, the present disclosure provides a method of meeting a pre-defined requirement for UL measurement when low-activity state configuration is used. Additionally, embodiments of the present disclosure provide a method for allowing a node to adapt or adjust UL signals. More particularly, in one embodiment, a measuring node 30a is configured to adapt its UL measurements responsive to the information about low-activity state configuration of the transmitting node 30b. In another embodiment, a transmitting node 30b is configured to adapt its UL transmission when configuring low-activity states to comply with a pre-defined requirement or rule. Further, the present disclosure provides a method for adjusting the UL signal configuration to incorporate the low-activity state configuration necessary for UL measurements.

Methods in a Measuring Node

The embodiments described in this section with respect to FIGS. 4A-4E may be combined in any manner needed or desired with embodiments described in other sections. Further, some examples of the measuring node configured to perform the method include, but are not limited to, another wireless device (e.g., in device-to-device communication), a non-serving eNodeB, a radio base station not operating in the Primary Cell (PCell) of the transmitting node, a serving eNodeB where a measuring cell is non-serving cell, an LMU, and the like.

Figure 4A:
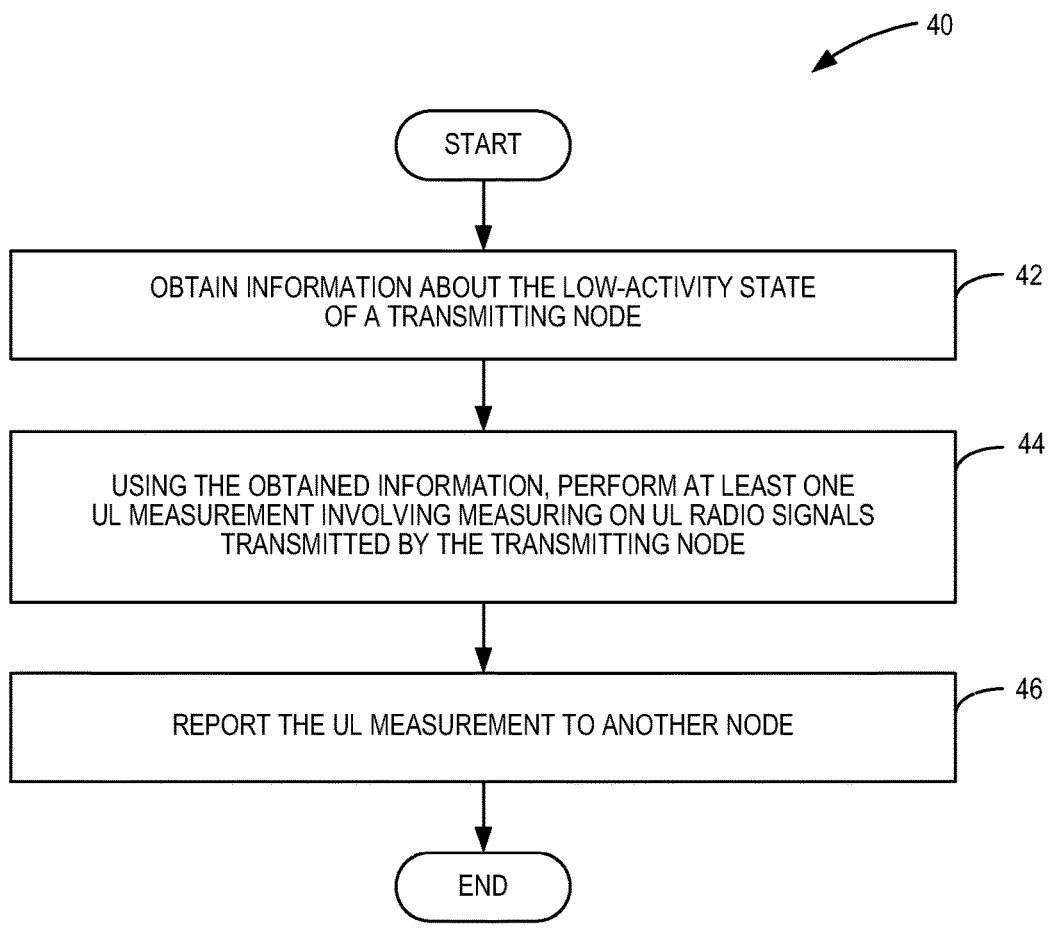
FIGS. 4A-4E is a flow diagram illustrating a method performed by a measuring node for using information obtained about the low-activity state of a transmitting node to perform at least one UL measurement according to one embodiment.

As seen in FIG. 4A, method 40 begins with the measuring node obtaining information about the low-activity state of the transmitting node (e.g., of a wireless device) (box 42). The measuring node then uses the obtained information to perform at least one UL measurement involving measuring on UL radio signals transmitted by the transmitting node (box 44). Finally, the measuring node may optionally report the measurement to another node (box 46).

Figure 4B:
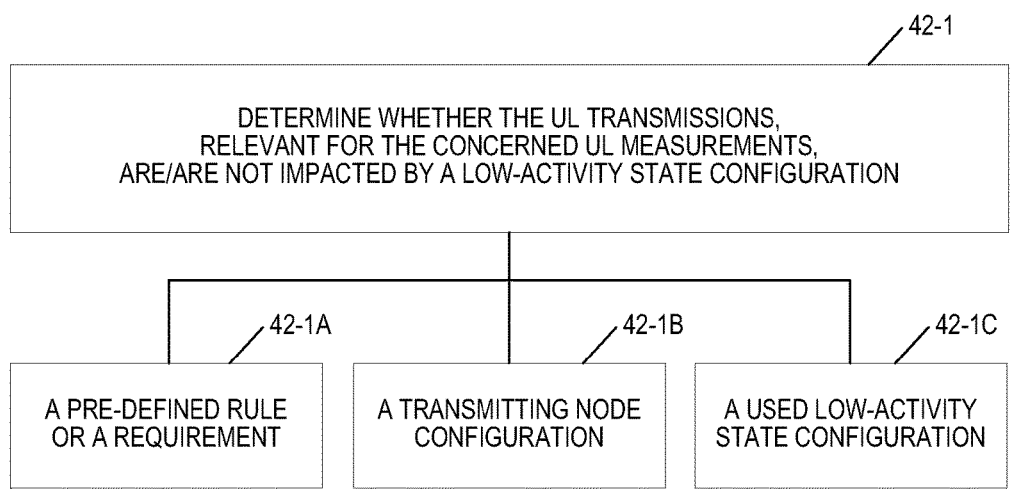
Figure 4C:
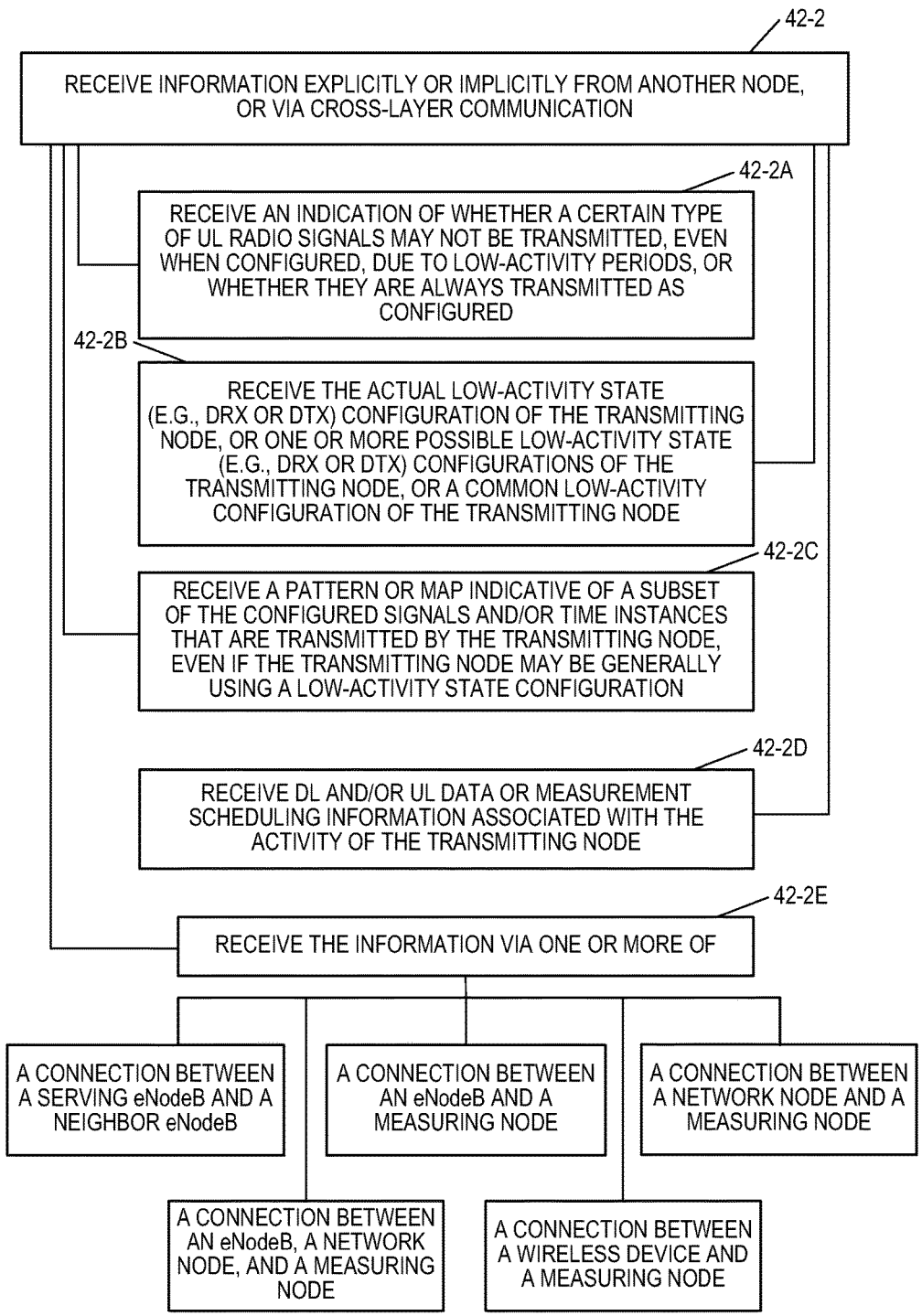
Figure 4D:
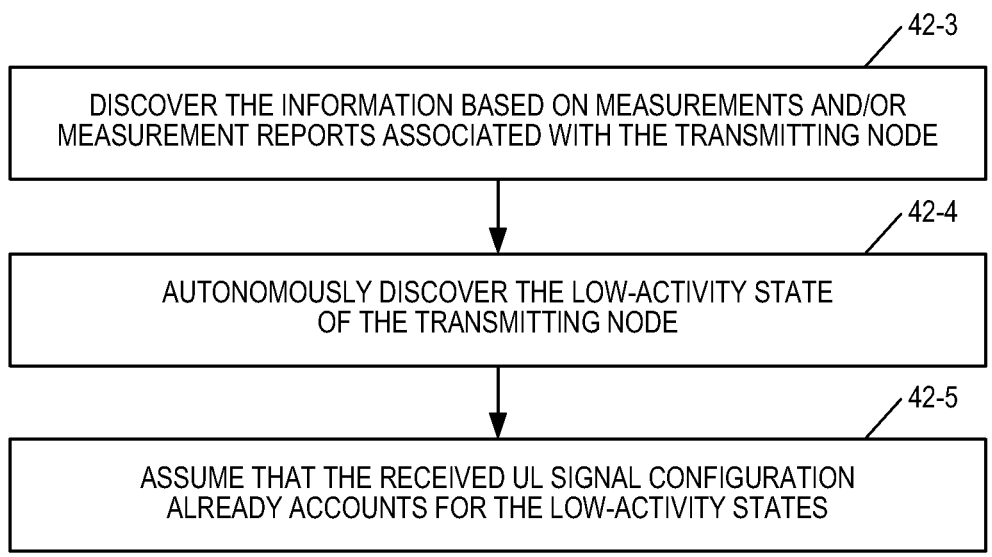

As seen in FIGS. 4B-4D, obtaining the information about the low-activity state of the transmitting node may comprise, for example, any one or any combination of the following embodiments.

In one embodiment (FIG. 4B), obtaining the information comprises determining (box 42-1) whether the UL transmissions, relevant for the concerned UL measurements, are or are not impacted by a low-activity state configuration (e.g., whether the UL transmissions are only possible DRX ON or DRX active time or the transmitting node may wake up also for transmitting some or all the configured SRS), may be based on one or more of:

a pre-defined rule or a requirement (box 42-1A);

a transmitting node configuration (e.g., when the transmitting node may or may not be configured to wake up to transmit certain radio signals such as periodic SRS or UL radio signals for a certain purpose such as for positioning, emergency, device-to-device communication, etc.) (box 42-1B); and a used low-activity state configuration—e.g., a low-activity state used by the transmitting node 30b) (box 42-1C).

In another embodiment (FIG. 4C), the information is received (box 42-2) explicitly or implicitly from another node or via cross-layer communication. By way of example only, receiving the information explicitly or implicitly from another node or via cross-layer communication may comprise:

receiving (box 42-2A) an indication of whether a certain type of UL radio signals may not be transmitted, even when configured, due to low-activity periods, or whether they are always transmitted as configured. In such cases, the indication may also comprise a transmitting node's capability to always transmit a certain type of UL signals, or at least to ensure a certain number of UL radio signal transmissions, regardless of whether low-activity states are used.

receiving (box 42-2B) the actual low-activity state (e.g., DRX or DTX) configuration of the transmitting node, or one or more possible low-activity state (e.g., DRX or DTX) configurations of the transmitting node, or a common low-activity configuration of the transmitting node that may be used by a group of wireless devices or all wireless devices in a cell.

receiving (box 42-2C) a pattern or map indicative of a subset of the configured signals and/or time instances (e.g., subframes) that are transmitted by the transmitting node, even if the transmitting node may be generally using a low-activity state configuration.

receiving (box 42-2D) DL and/or UL data or measurement scheduling information associated with the activity of the transmitting node (e.g., scheduling grant information, semi-persistent scheduling resource allocation pattern, a transmission pattern, a reporting configuration of the transmitting node, or the like). For example, if a set of subframes for PUSCH transmissions is known, then it is also known that the UE will be in active state and thus will also be transmitting the reference signals.

receiving (box 42-2E) the information via one or more of the following direct or logical connections:
  serving eNodeB->neighbor eNodeB;
  eNodeB->measuring node;
  network node (e.g., MDT, SON, O&M, positioning node, controlling node, RNC, gateway, etc.)->measuring node
  eNodeB->network node (e.g., MDT, SON, O&M, positioning node, controlling node, RNC, gateway, etc.)->measuring node
  wireless device->measuring node Notably, receiving the information via cross-layer communication may apply, for example, when (1) the measuring cell is a non-serving cell of a serving eNodeB; or (2) a measuring node, such as a remote antenna, an RRH, an RRU, or the like, is comprised in a distributed antenna system, a Coordinated MulitPoint (COMP) Transmission system, or a system with multiple distributed receivers, such as those that support distributed or joint processing.

In another embodiment (FIG. 4D), obtaining the information about the low-activity state of the transmitting node may comprise discovering (box 42-3) the information based on measurements and/or measurement reports associated with the transmitting node. For example, the low-activity state of the transmitting node may be discovered by analyzing received measurement reports comprising measurements performed by the transmitting node and/or by another radio node measuring on radio signals transmitted by the transmitting node. Alternatively or additionally, the low-activity state of the transmitting node may be determined by analyzing the measurement report periodicity.

In another embodiment, obtaining the information about the low-activity state of the transmitting node may comprise autonomously discovering (box 42-4) the low-activity state of the transmitting node by, for example, blind detection of the configured radio signals that may be transmitted by the transmitting node.

In one embodiment, a measuring node may also assume (box 42-5) that the received UL signal configuration already accounts for the low-activity states. For example, it might have been adjusted, as described below in more detail, by the configuring node, the transmitting node, or a network node from which the measuring node receives the configuration. In such situations, obtaining the information about the low-activity state of the transmitting node may be implicitly performed in the step of using the obtained information for performing at least one UL measurement.

Once the information is obtained, the measuring node, based on the obtained information, performs at least one UL measurement by measuring radio signals transmitted by the transmitting node, as previously described. The obtained information allows the measuring node to avoid performing the measurement on radio signals that are configured/scheduled, but not transmitted, which would degrade the measurement performance or lead to its failure.

Figure 4E:
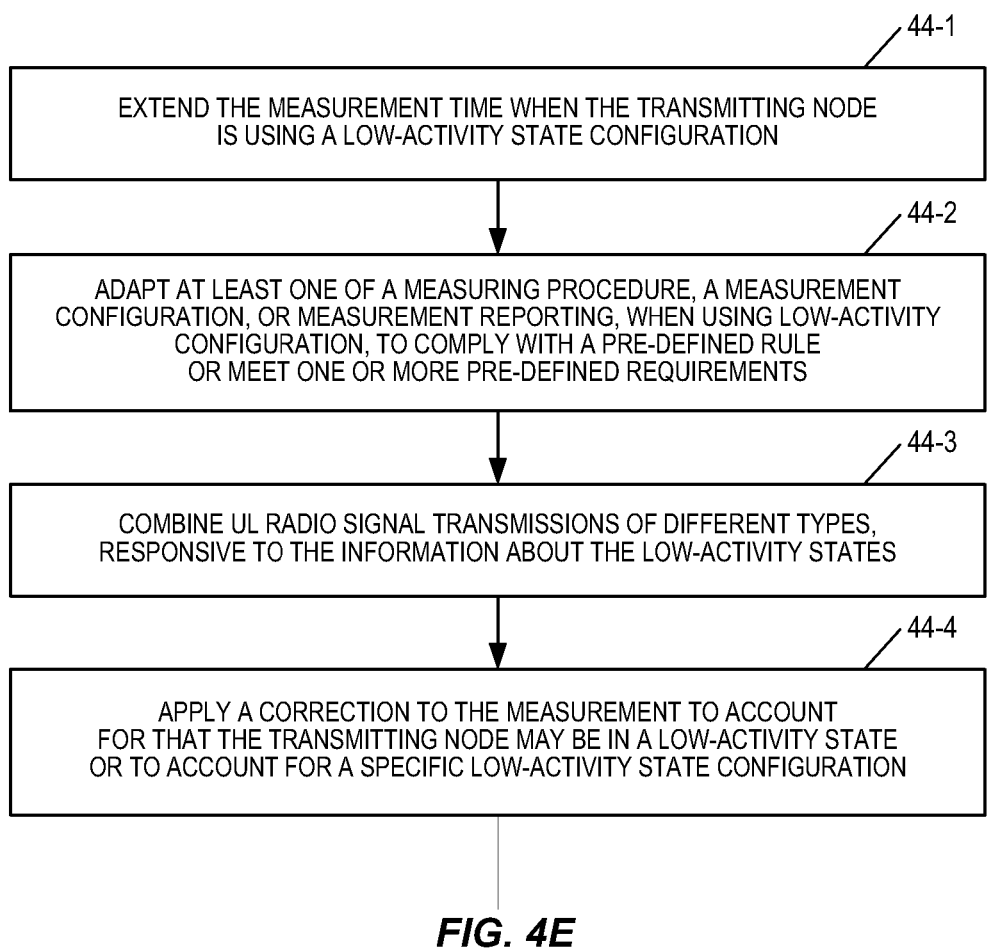

As seen in FIG. 4E, the measuring node may perform the UL measurements differently, depending on whether the transmitting node is using a low-activity state configuration or not. For example, one or any combination of the following is possible:

In one embodiment, the measuring node may extend (box 44-1) the measurement time when the transmitting node is using a low-activity state configuration. In one example, the time may also depend on the low-activity state configuration used by the transmitting node, as described in more detail below.

In another embodiment, the measuring node may adapt (box 44-2) at least one of a measuring procedure, a measurement configuration, or measurement reporting, when using low-activity configuration, to comply with a pre-defined rule or meet one or more pre-defined requirements, as described more fully below. Some examples of measurement procedures or configurations are measurement time, timers associated with a measurement and/or measurement reporting, sampling configuration, periodicity of sampling, measurement bandwidth, number of parallel measurements, number of used measurement occasions comprising measured radio signals, measured radio signal detection threshold, sensitivity level, false alarm, FFT size, search window (e.g., the longer total measurement time may result in a need to configure a larger search window), number of measured carriers used by the transmitting node for radio signal transmissions, and the like.

In another embodiment, the measuring node may combine (box 44-3) UL radio signal transmissions of different types, responsive to the information about the low-activity states. For example, the measuring node may determine that UL transmissions of a first type are not transmitted during certain states associated with low-activity configuration of the transmitting node and instead UL transmissions of a second type are transmitted. In one embodiment, the second type UL transmissions may be transmitted in the same resources (e.g., subframes) where first-type UL transmissions would have been transmitted otherwise. An example of the first type is trigger-type-0 SRS, and an example of the second type is trigger-type-1 SRS.

In another embodiment, a measuring node may apply (box 44-4) a correction to the measurement to account for that the transmitting node may be in a low-activity state or to account for a specific low-activity state configuration (in one example, the correction may be based on interference or noise estimation and/or may comprise a timing compensation).

Methods in a Transmitting Node

Figure 5A:
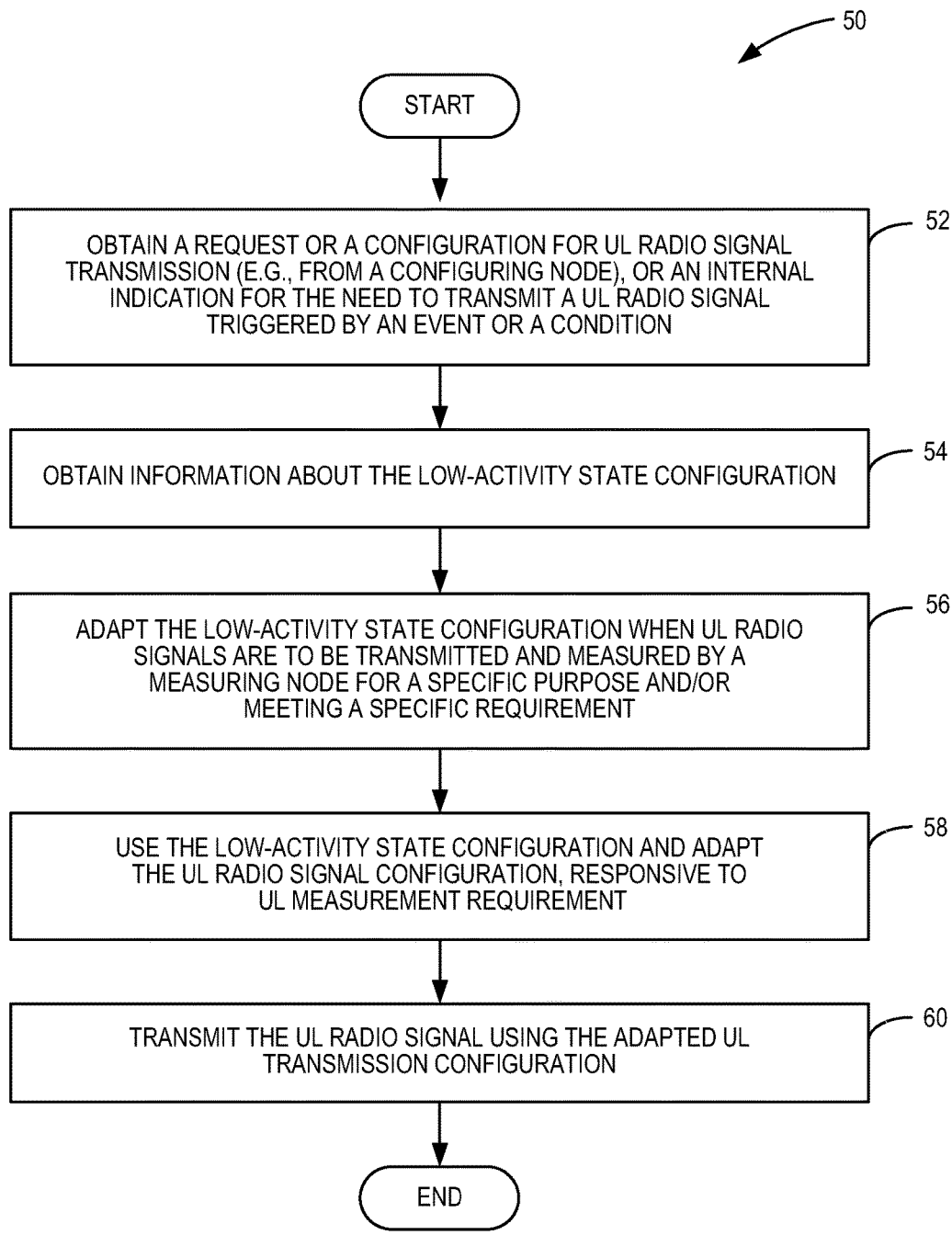
FIGS. 5A-5C is a flow diagram illustrating a method performed by a transmitting node for adapting a UL radio signal configuration according to one embodiment.
Figure 5B:
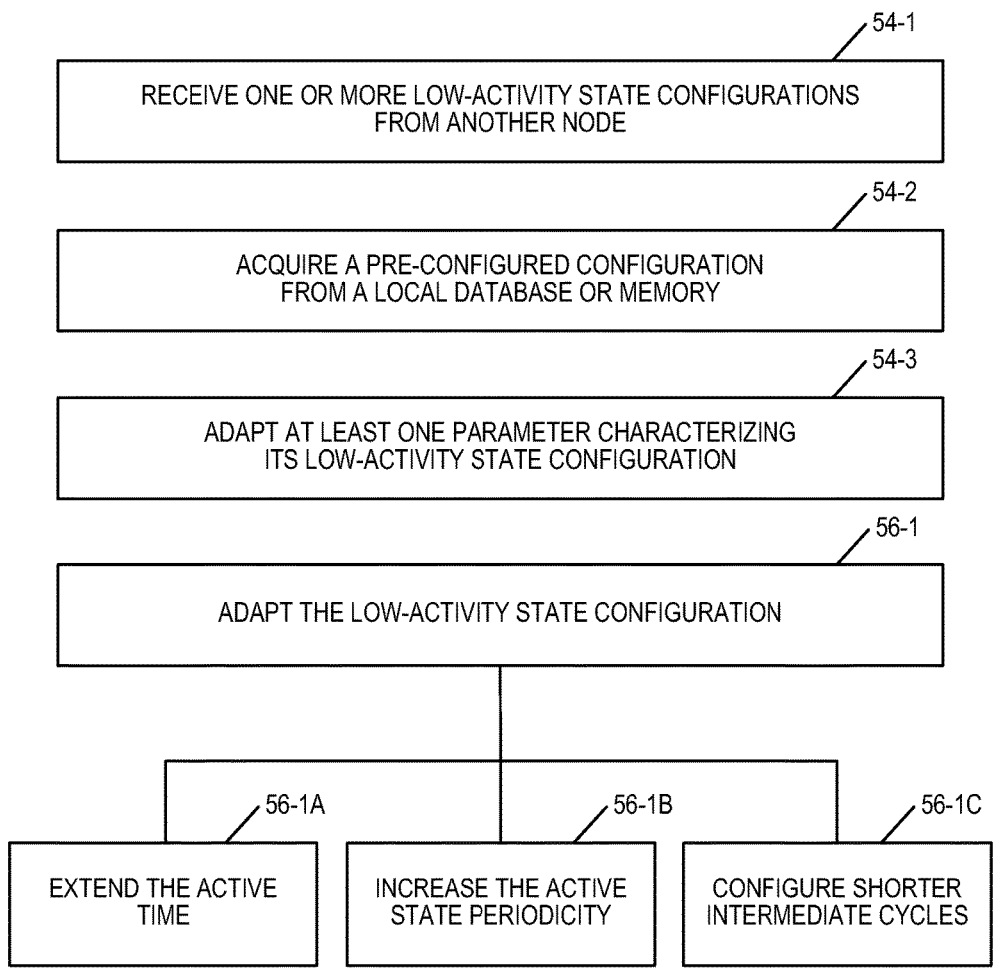
Figure 5C:
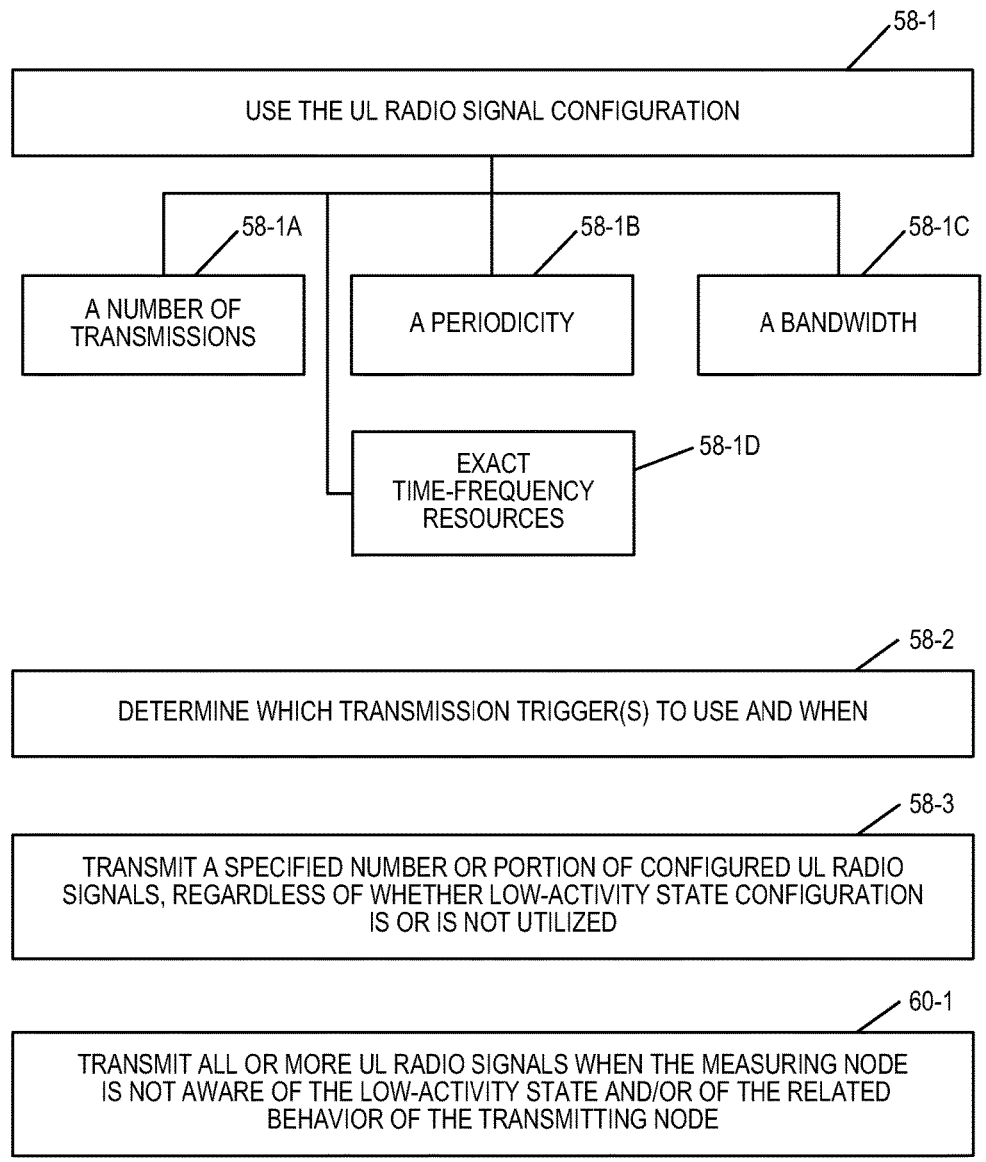

The embodiments described in this section with respect to FIGS. 5A-5C are performed by a transmitting node 30b, and may be combined with embodiments described in other sections in any manner. Some examples of a transmitting node 30b include, but are not limited to, a wireless device, a radio base station or any radio network node transmitting at least one UL radio signal used for UL measurements by a measuring node.

As seen in FIG. 5A, method 50 begins with the transmitting node, optionally, obtaining a request or a configuration for UL radio signal transmission (box 52). The request may be obtained from a configuring node, for example, or it may be an internal indication identifying a need to transmit UL radio signal triggered by an event or a condition. The indication may also indicate a certain type or purpose for the UL radio signal transmission.

The transmitting node then obtains the information about its low-activity state configuration (box 54). Optionally, the transmitting node adapts the low-activity state configuration when UL radio signals are to be transmitted and measured by a measuring node for a specific purpose and/or meeting a specific requirement (box 56).

The transmitting node then uses the low-activity state configuration and adapting UL radio signal configuration, responsive to UL measurement requirement (box 58). The measurement may be of a certain type or for a certain purpose, such as emergency positioning, for example, wherein the measurement is performed by the measuring node. The transmitting node then transmits the UL radio signal using the adapted UL transmission configuration (box 60).

As seen in FIG. 5B, obtaining the request or configuration, as well as the information about the low-activity state configuration, may be performed in a variety of ways. For example, the transmitting node 30*a* may receive (box 54-1) one or more low-activity state configurations from another node (e.g., from a serving eNodeB), acquire (box 54-2) a pre-configured configuration from a local database or memory, and/or decide itself or adapt (box 54-3) at least one parameter characterizing its low-activity state configuration.

In one embodiment, the obtained or adapted parameter(s) may comprise one or more of an active state duration (e.g., $\tau_{Active}$, which is described later in more detail), an active state periodicity, a usage of short intermediate cycles, a configuration of short cycles, an offset or a reference time point for a timer controlling low-activity state configuration, a configurable set of UL radio signal transmission triggers, and a configurable set of UL signals that may be transmitted during the inactive state (depending on the purpose or UL measurement requirement, for example). Other values for the parameters are also possible, and they may be combined in any manner needed or desired.

Adapting the low-activity state configuration (box 56-1) may comprise, for example, extending the active time (box 56-1A), increasing the active state periodicity (box 56-1B), or configuring shorter intermediate cycles (box 56-1C).

Further, adapting the low-activity state configuration may be autonomously performed by the transmitting node and/or with or without assistance from the configuring node (e.g., by providing a set of configurations to allow the transmitting node to adaptively choose a suitable low-activity configuration). In another embodiment, adapting the low-activity state configuration may be performed according to a pre-defined rule.

The transmitting node decides to use the UL radio signal configuration (box 58-1) based on, for example, a number of transmissions (box 58-1A), a periodicity (box 58-1B), a bandwidth (box 58-1C), exact time-frequency resources (box 58-1D), and the like. Further, adapting the UL radio signal configuration may comprise, deciding which transmission trigger(s) to use and when (box 58-2). For example, when SRS are configured, trigger-type-0 SRS are not transmitted during inactive state, which may degrade UL measurement quality at a measuring node, especially when the measuring node is not fully aware of the low-activity state configuration of the transmitting node and the transmitting node behavior when low-activity state configuration is used. Therefore, a transmitting node may choose to transmit trigger-type-1 SRS, in order to maintain UL measurement quality at the measuring node.

Adapting the UL radio signal configuration may also comprise transmitting (box 58-3) a certain number or portion of configured UL radio signals, regardless of whether low-activity state configuration is or is not utilized. This may imply that a transmitting node may decide to enter an active state to transmit some UL radio signals simply to ensure that a certain number or portion of UL radio signals are transmitted, and thus, can be received by the measuring node. There may also be corresponding transmitting node's capability which may be signaled to another node (e.g., a configuring node, a network node, or a measuring node), to inform a measuring node that at least a certain portion of configured UL radio signals will be transmitted by the transmitting node.

In another embodiment, the transmitting node may transmit (box 60-1) all or more UL radio signals when the measuring node is not aware of the low-activity state and/or of the related behavior of the transmitting node, compared to when the measuring node is aware of the low-activity state and/or of the related behavior of the transmitting node. For example, consider a situation in which a non-serving eNodeB or LMU performs the UL measurement compared to a situation in which the UL measurement is performed by the serving eNodeB.

The transmitting node's behavior may also be determined by a pre-defined rule, controlled, or requested by another node (e.g., by the configuring node) by sending a corresponding request/indication to the transmitting node.

Methods in a Configuring Node

Figure 6A:
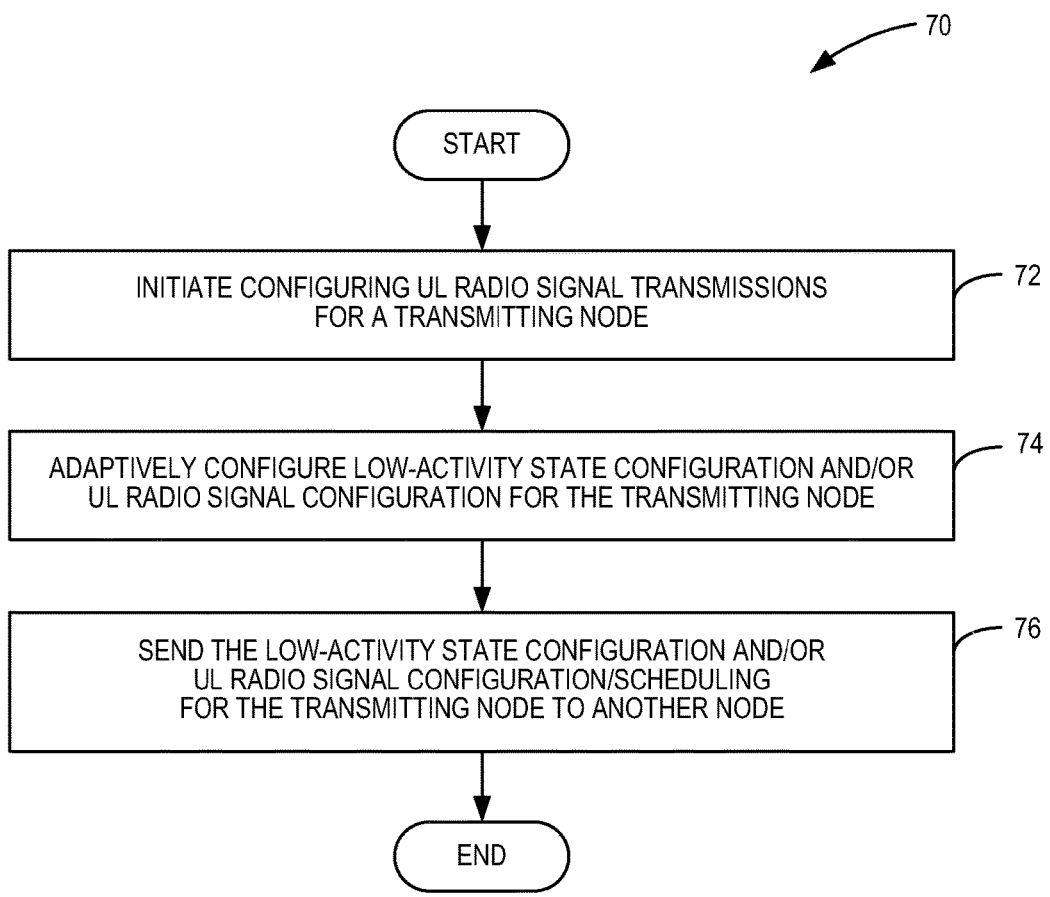
FIGS. 6A-6C is a flow diagram illustrating a method performed at a configuring node for adaptively configuring the low-activity state configuration and/or the radio signal configuration for the transmitting node in accordance with one embodiment.
Figure 6B:
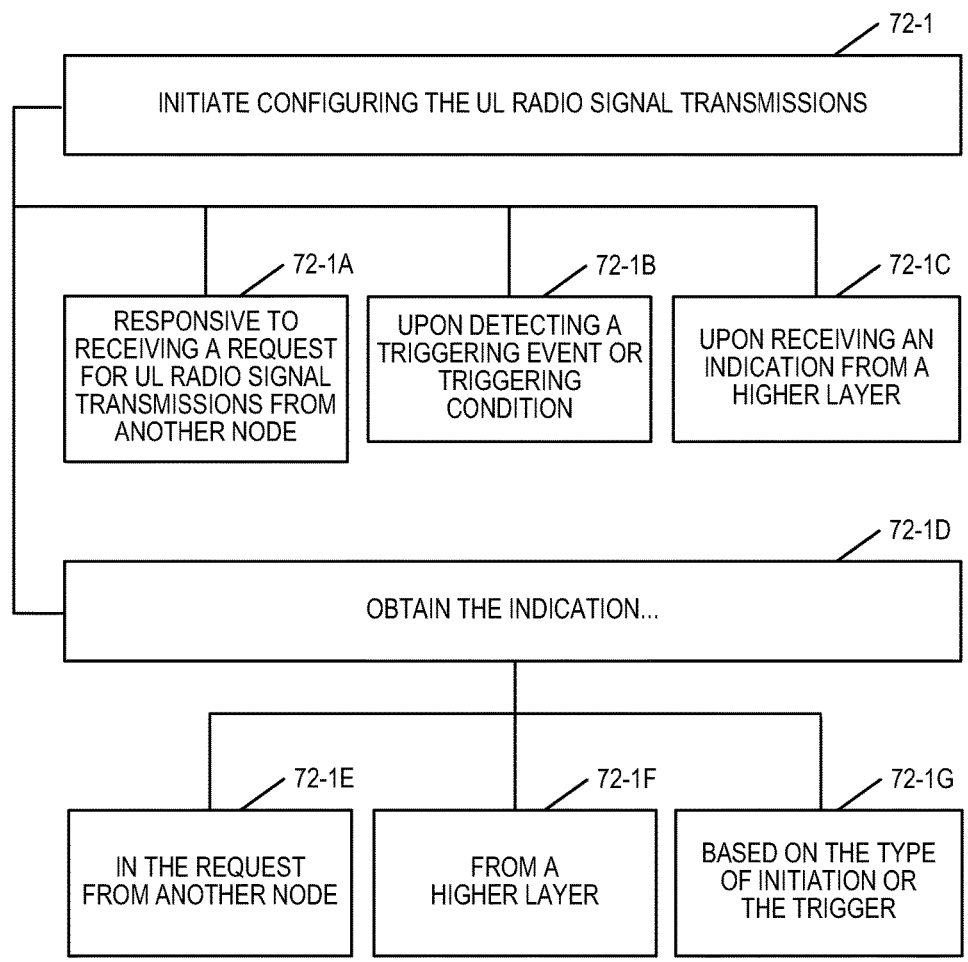
Figure 6C:
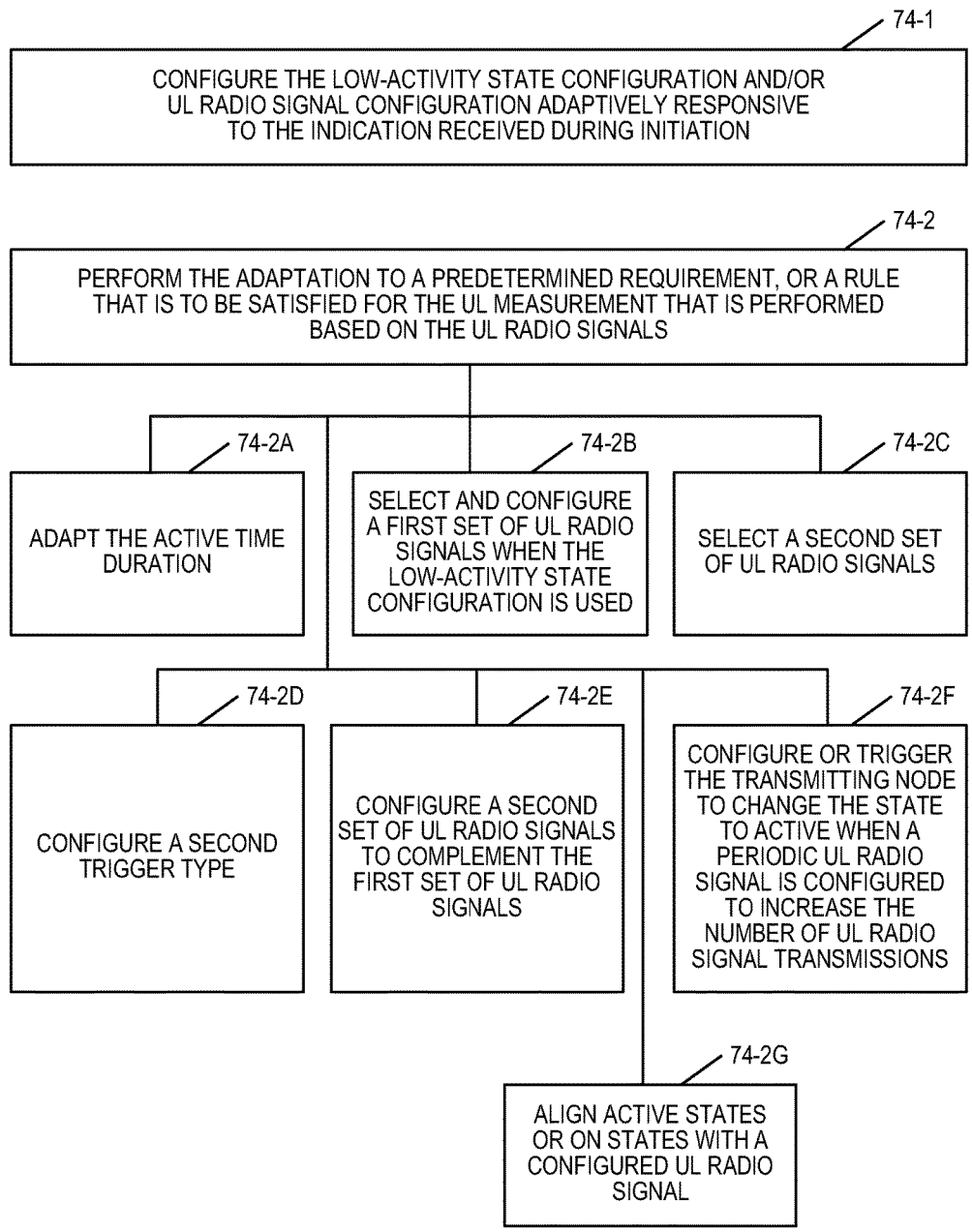

The embodiments described with respect to FIGS. 6A-6C are performed by a configuring node 30*c*, and further, may be combined in any manner needed or desired with the embodiments described in other sections. The configuring node 30*c* may comprise, for example, an eNodeB, a wireless device, or a network node (e.g., coordinating node, a positioning node, etc.). In one embodiment, the configuring node 30*c* is the same as transmitting node 30*b*.

A configuring node 30*c* may comprise a first configuring node which configures or sends a desired, recommended, or requested configuration to a second configuring node. For example, a first configuring node may be a positioning node that sends a request with the number of SRS transmissions to an eNodeB for network-based positioning. The eNodeB, in turn, may use this information for configuring UL radio signals in a UE to be measured by LMU or multiple eNodeBs.

As seen in FIG. 6A, method 70 begins with the configuring node initiating configuring the UL radio signal transmissions for a transmitting node (box 72). The configuring node then adaptively configures the low-activity state configuration and/or the UL radio signal configuration for the transmitting node (box 74). The configuring node then, optionally, sends the low-activity state configuration and/or the UL radio signal configuration/scheduling for the transmitting node to another node (box 76), such as the transmitting node, and/or another network node (e.g., an eNodeB, a positioning node, a measuring node, and the like).

As seen in FIG. 6B, initiating configuring the UL radio signal transmissions (i.e., box 72) may be performed in any manner desired. However, in at least some embodiments, the initiation (box 72-1) occurs responsive to receiving a request for UL radio signal transmissions from another node (box 72-1A), or upon detecting a triggering event, or upon detecting a triggering condition (box 72-1B), or upon receiving an indication from a higher layer (box 72-1C).

Initiating configuring the UL radio signal transmissions may also comprise obtaining (box 72-1D) the indication in the request from another node (box 72-1E), or from the higher layer (box 72-1F, or based on the type of initiation or the trigger (box 72-1G). Additionally, the indication may be obtained explicitly or implicitly, and may comprise, for example, a purpose and/or a desired configuration of UL radio signals (e.g., a bandwidth, a number of transmissions, a maximum measurement time, a time when the UL transmissions are expected to start and/or complete, a pattern when the UL transmissions may be transmitted/measured, a target measurement quality, a target positioning QoS, such as described in the 3GPP TS 22.071 version 11.0.0 Release 11 dated October, 2012, a measurement node capability indicative of a desired UL radio signal configuration, a measurement requirement (which is described more fully below), a distance or location of the measuring node, a radio environment characteristics or interference at the measuring node, and the like).

In one embodiment, the configuring node 30c is an eNodeB, and a request may be received from another eNodeB or from a positioning node, and the measuring node 30a is another eNodeB or LMU.

As seen in FIG. 6C, adaptively configuring the low-activity state configuration and/or the UL radio signal configuration (i.e., box 74) may comprise configuring the low-activity state configuration and/or UL radio signal configuration adaptively responsive to the indication received during the initiation step (box 74-1).

Adaptively configuring the low-activity state configuration and/or the UL radio signal configuration may further comprise performing (box 74-2) the adaptation to a predetermined requirement (as described in more detail below), or a rule that is to be satisfied for the UL measurement that is performed based on the UL radio signals.

To adaptively configure the low-activity state configuration and/or the UL radio signal configuration, the configuring node may, for example, adapt the active time duration (e.g., extend DRX ON or a timer which may extend the active time when SRS periodicity does not meet a threshold (box 74-2A). For example, the periodicity may be longer than a threshold, or the number of SRS per one active time, or ON time duration, is below a threshold).

The configuring node may also select and configure a first set of UL radio signals when the low-activity state configuration is used (box 74-2B). Otherwise, the configuring node may select a second set of UL radio signals (box 74-2C). The first set and the second set of UL radio signals may be of the same or of a different type of radio signals, but may have at least one different configuration parameter.

Additionally, the configuring node may configure a second trigger type (box 74-2D), wherein trigger type 1 is for SRS, when the number of SRS transmissions in the active time duration with a first trigger type (e.g., periodic SRS with trigger type 0) is below a threshold, as described in more detail below. In one particular embodiment, the second trigger triggers the UL radio signals comprised in the set of UL radio signals which would otherwise be triggered by the first trigger.

Further, the configuring node may configure a second set of UL radio signals to complement the first set of UL radio signals (box 74-2E), to increase the probability that the configured UL radio signals are actually transmitted by the transmitting node. As described in more detail later, this could help ensure the UL measurement performance.

In one particular embodiment, the second set of UL radio signals may have a set of some or all parameters that are the same as those of the first set of UL radio signals. The first and the second sets of UL radio signals may be associated with different transmission or transmission triggering rules that specify, for example, when the UL radio signals can or cannot be transmitted.

Additionally, the configuring node 30c may configure or trigger the transmitting node 30b to change the state to active when a periodic UL radio signal is configured to increase the number of UL radio signal transmissions (box 74-2F), which otherwise would be less if the transmitting node may not or should not transmit the configured periodic UL radio signal when inactivity time is running. The configuring/triggering the state change may be, for example, performed via an additional transmission in the DL, such as by a data transmission or a control channel transmission, for example, that is monitored or received by the transmitting node so that the active time is extended and configured UL radio signals can be actually be transmitted.

Further, the configuring node 30c may align active states or ON states with a configured UL radio signal to ensure that the number of UL radio signals within the active or ON states is above a threshold (box 74-2G).

Sending the low-activity state configuration and/or UL radio signal configuration/scheduling for the transmitting node to another node may be accomplished, for example, via a standardized or proprietary interface, via inter-node signaling, or via cross-layer communication. Further, the configuration may be a desired or recommended configuration.

Figure 7A:
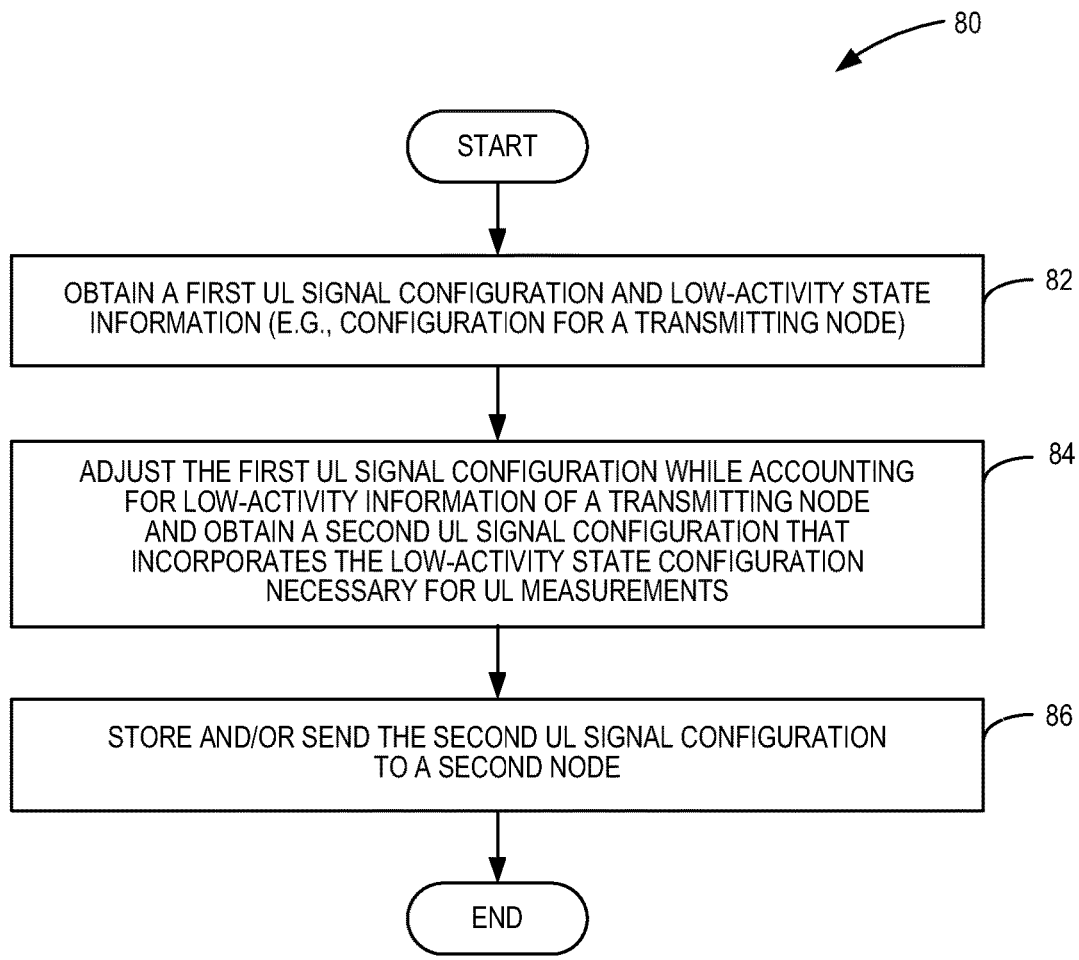
FIGS. 7A-7B is a flow diagram illustrating a method for adjusting a UL signal coordination while accounting for low-activity information of a transmitting node in accordance with one embodiment.

Methods of Adjusting UL Signal Configuration Accounting for Low-Activity Configuration of a Transmitting Node FIG. 7A is a flow diagram illustrating a method 80 for adjusting a UL signal configuration accounting for the low-activity configuration of a transmitting node. As seen in FIG. 7A, a first node obtains a first UL signal configuration and low-activity state information (e.g., configuration) for a transmitting node 30b (box 82). For example, the first node may acquire the first UL state configuration and low-activity state information from a memory or a database, receive the first and/or the second information from another node, or by any other method known needed or desired.

Once the configuration and information has been obtained, the first node adjusts the UL signal configuration while accounting for the low-activity information of a transmitting node, and obtains a second UL signal configuration that "incorporates" the low-activity state configuration necessary for UL measurements (box 84). Thereafter, the first node stores and/or sends the second UL signal configuration to a second node (box 86) so that the second node can perform, for example, UL measurements based on the adjusted configuration or for interference coordination as an indication of the actual UL transmissions.

The first and second nodes may comprise any node needed or desired, as is seen by the examples provided in Table 1. Those of ordinary skill in the art will appreciate that the nodes and their pairings identified in Table 1 are merely illustrative and not limited to those that are listed.

TABLE 1

| FIRST NODE | SECOND NODE |
| --- | --- |
| eNodeB | eNodeB |
| eNodeB | Network Node |
| eNodeB | Measuring Node |
| Wireless Device | Measuring Node |
| Wireless Device | Network Node |
| Configuring Node (General) | Measuring Node |
| Configuring Node (General) | Network Node |
| Configuring Node (General) | Measuring Node, via a Network Node (General) |

TABLE 1-continued

| FIRST NODE | SECOND NODE |
| --- | --- |
| Transmitting Node (General) | Measuring Node |
| Network Node (General) | Measuring Node |

Figure 7B:
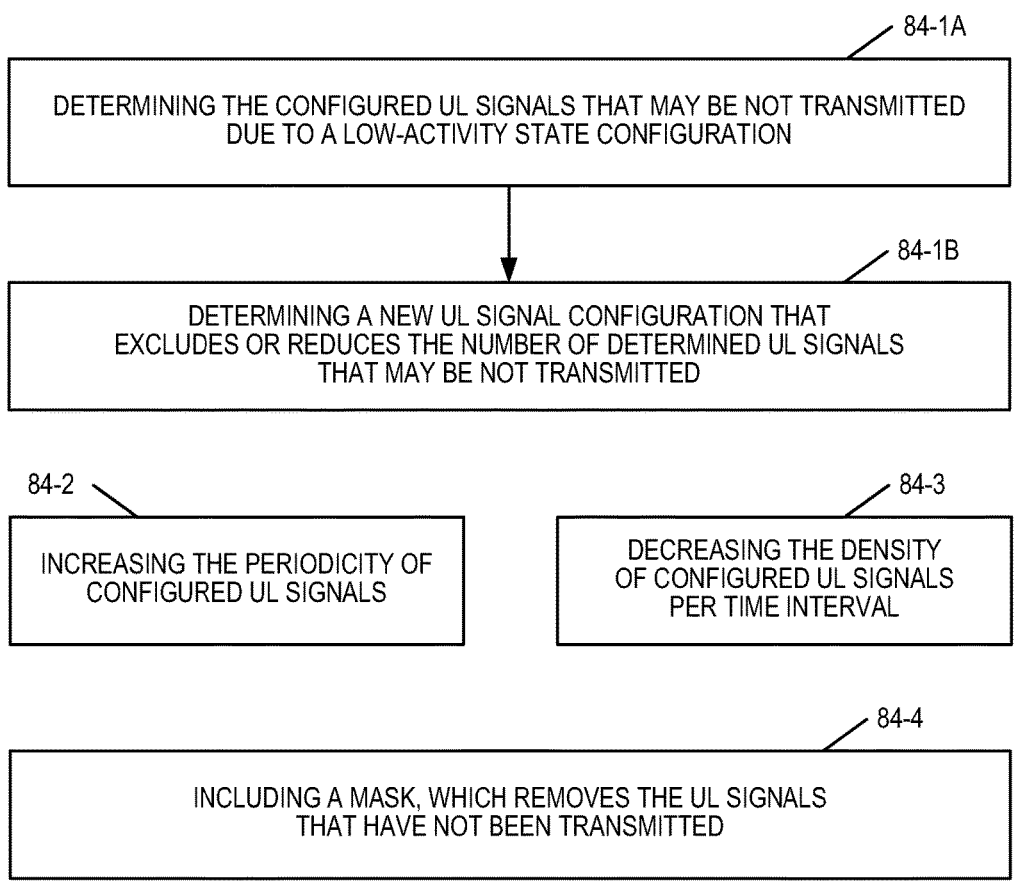

As seen in FIG. 7B, adjusting the first UL signal configuration while accounting for low-activity information of a transmitting node may comprise determining (box 84-1A) the configured UL signals that may be not transmitted due to a low-activity state configuration, and determining (box 84-1B) a new UL signal configuration that excludes or reduces the number of determined UL signals that may be not transmitted. The advantage with this embodiment is that the measuring node may not be aware of the UL signals which may not be transmitted due to the low-activity states since the new configuration does not include them. This reduces the complexity of the measuring node and improves the UL measurement performance (e.g., reduced errors due to blind detection).

Further, adjusting the first UL signal configuration while accounting for low-activity information of a transmitting node may comprise, for example, increasing the periodicity of configured UL signals (box 84-2) or decreasing the density of configured UL signals per time interval (box 84-3) (e.g., taking the maximum or LCM of $T_{Active}$ and $T_{UL}$), and/or including a mask (box 84-4), which removes the UL signals that have not been transmitted, in the new UL signal configuration.

In one embodiment, the transmitting node receives the first UL signal configuration, but the second (adjusted) UL signal configuration may or may not be signaled to the transmitting node. In the latter case, the first and the second UL signal configurations are different.

In another embodiment, the adjustment may be performed by the transmitting node 30b, based on the first UL configuration received from another node or obtained by other methods, e.g., by a pre-defined rule.

Methods of Complying with Pre-Defined Rules or Meeting Requirements

The embodiments described in this section may be combined with any of the embodiments described in other sections of the disclosure in any manner needed or desired.

A measuring node 30a may have to perform one or more UL measurements, while meeting one or more requirements. Some examples of the requirements include, but are not limited to, measurement time, measurement accuracy, minimum signal detection probability, maximum error rate or false alarm rate, power control procedure and power control accuracy, and Block Error Ratio (BLER).

To ensure that a requirement can be met by the measuring node 30a, at least one or more of a measuring node 30a, a transmitting node 30b, a configuring node 30c, and a network node may need to implement at least one embodiment described in the present disclosure. The nodes may also be tested in a test environment, which may also need to implement corresponding embodiments. A test environment may comprise software, a computer program, middleware, hardware, or any combination thereof. A test may be conducted, for example, in a lab, in a test bed, or at least partly in a real network. Such tests may be conducted one or more times, for example, to achieve a predetermined or target statistical confidence. The test equipment may also measure a metric under test and compare the measured metric to a reference value (for example, a requirement, a pre-defined value, or a pre-configured value).

UL Measurement Time

A measuring node may have to perform one or more UL measurements within a certain maximum measurement time. This time may be, for example, pre-defined or determined by a pre-defined rule.

In one embodiment, the UL measurement, as previously defined, time depends on the low-activity state configuration. In general form, $$t = f(C_{LowActivity}), \quad \text{Eq. 1}$$

where $C_{LowActivity}$ is the low-activity state configuration, such as DRX and/or DTX configuration, for example.

In another embodiment, the measurement time may depend on both the low-activity state configuration and the UL signal configuration/scheduling (i.e., not all of the configured/scheduled UL signals may then be transmitted).

$$t = f(C_{LowActivity}, C_{UL}). \quad \text{Eq. 2}$$

In one embodiment, when the configured/scheduled UL signals are periodic, the measurement time may depend on the periodicity of the configured UL signals.

$$t = f(C_{LowActivity}, T_{UL}). \quad \text{Eq. 3}$$

Figure 8:
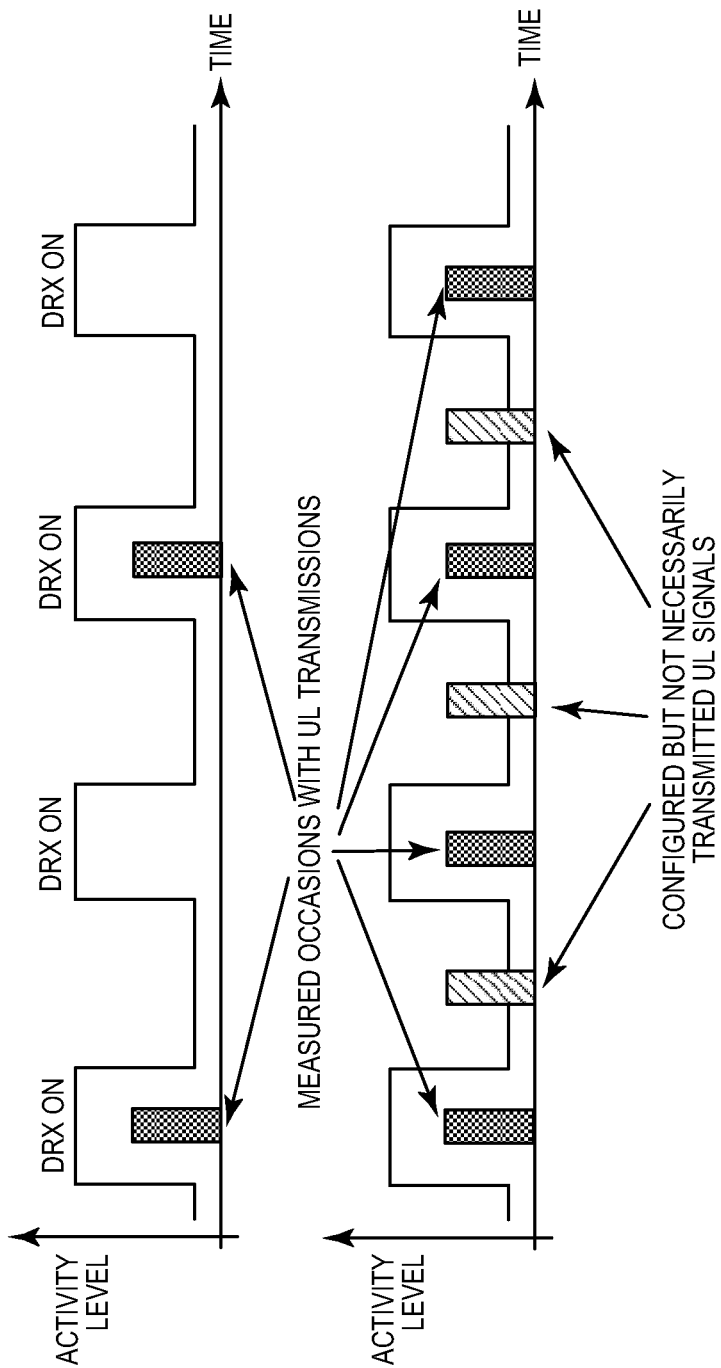
FIG. 8 is a timing diagram illustrating the different periodicities of active states and configured UL signals according to one embodiment.
Figure 9:
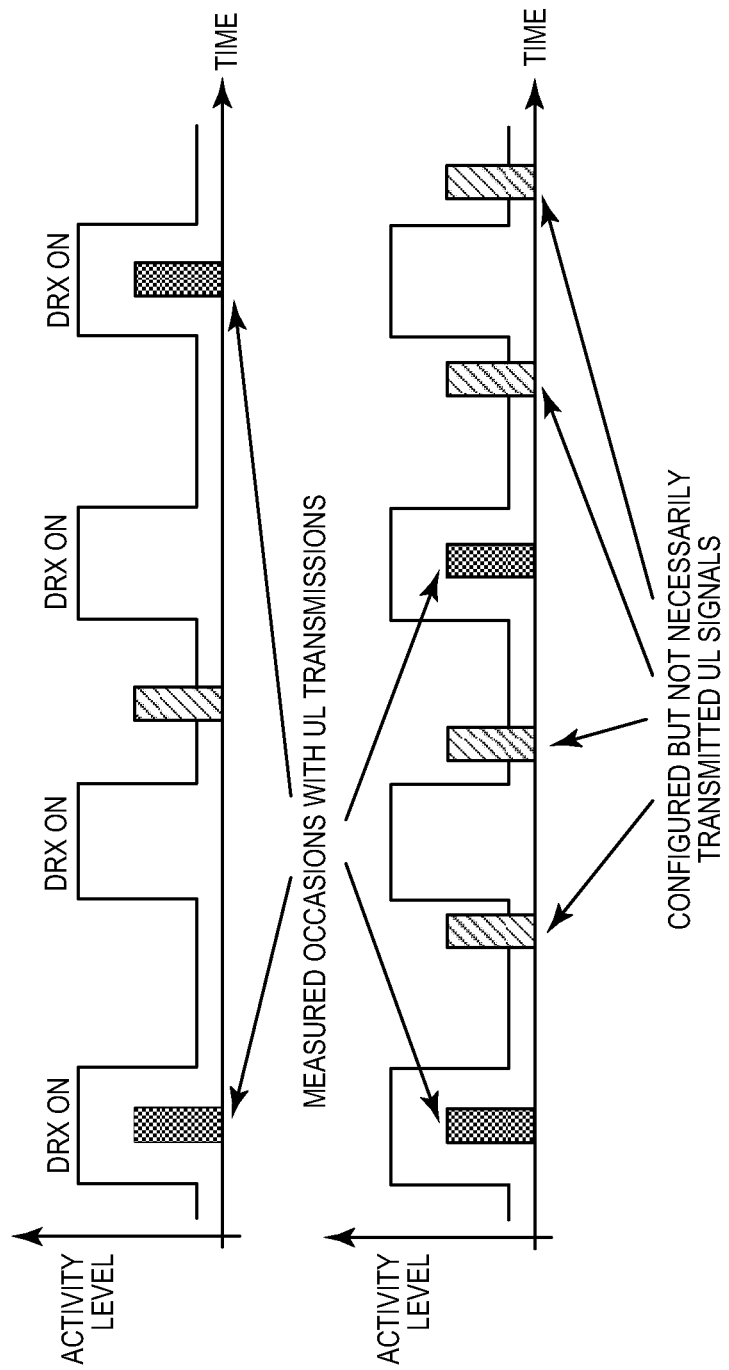
FIG. 9 is a timing diagram illustrating the different periodicities of active states and configured UL signals according to another embodiment.

In another embodiment, when the configured/scheduled UL signals are periodic, the measurement time may also depend on a function relating the periodicity of active states (e.g., DRX cycle length) comprised in a low-activity configuration and the periodicity of the configured UL signals (e.g., SRS periodicity). Thus, $$t = f(\psi(T_{Active}, T_{UL})), \quad \text{Eq. 4}$$

where an example function $\psi(\cdot)$ may be $\max(T_{Active}, T_{UL})$ (see FIG. 8) or LCM $(T_{Active}, T_{UL})$ (see FIG. 9, but note that LCM(x,y)=Least Common Multiple of x and y)).

In another embodiment, the measurement time may also depend on a number M of measurement occasions. By way of example only, the number may be determined by a bandwidth (e.g., measurement bandwidth or UL signal bandwidth). Additionally or alternatively, the number may be the number of measurement occasions necessary to meet a certain accuracy requirement. For example, $$t = LCM(T_{Active}, T_{UL}) \cdot (M-1) + \Delta, \quad \text{Eq. 5}$$

where $\Delta$ may be an extra margin (for example, a pre-defined implementation margin of 1-200 ms, or a function of a transmission periodicity and/or active state periodicity), and M is the number of measurement occasions the measuring node (e.g., LMU, eNodeB, or a wireless device) needs to meet an accuracy requirement for a timing measurement (e.g., UL RTOA, RTT, Rx-Tx, TOA, UL received signal strength or quality based on SRS, etc.) for a certain bandwidth.

In another embodiment, the active time of one active period may accommodate more than one UL transmission, which may justify that the measurement time depends on the active time length and/or the number of UL transmissions per active time period. For example, $$t = LCM(T_{Active}, T_{UL}) \cdot \left(\frac{M}{n} - 1\right) + \Delta, \quad \text{Eq. 6}$$

where $\Delta$ may be an extra margin, M is the number of measurement occasions the measuring node needs to meet an accuracy requirement for a timing measurement for a certain bandwidth, and n is the number (e.g., minimum non-zero number or an average) of available measurement occasions (e.g., configured UL signals) during one active state period.

In another example, parameter n may be calculated as $$n = \min\left(\left\lfloor \frac{\tau_{Active}}{T_{UL}} \right\rfloor, 1\right) \quad \text{Eq. 7}$$

or $$n = \left\lceil \frac{\tau_{Active}}{T_{UL}} \right\rceil.$$

Figure 11:
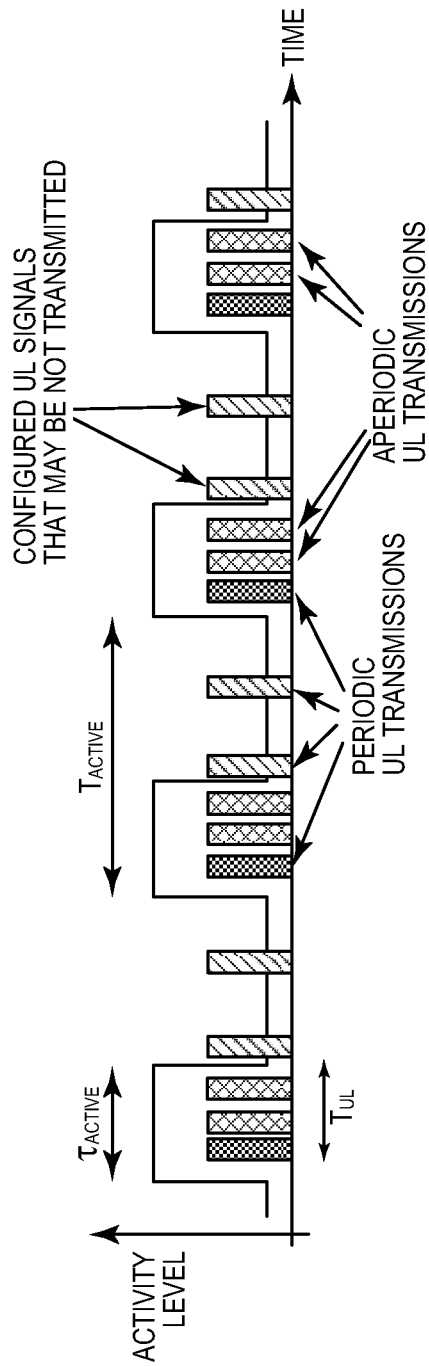
FIG. 11 is a timing diagram illustrating a mix of periodic and aperiodic UL radio signal transmissions and measurement windows according to one embodiment.

In another embodiment, the UL transmissions are not periodic, or as seen in FIG. 11, are a mix of periodic and aperiodic UL transmissions. In such cases, the measurement time may be generally defined as $$t = f(C_{Active}, M, n), \quad \text{Eq. 8}$$

where parameter n may be pre-configured, obtained by a pre-defined rule, and/or be configurable.

Figure 10:
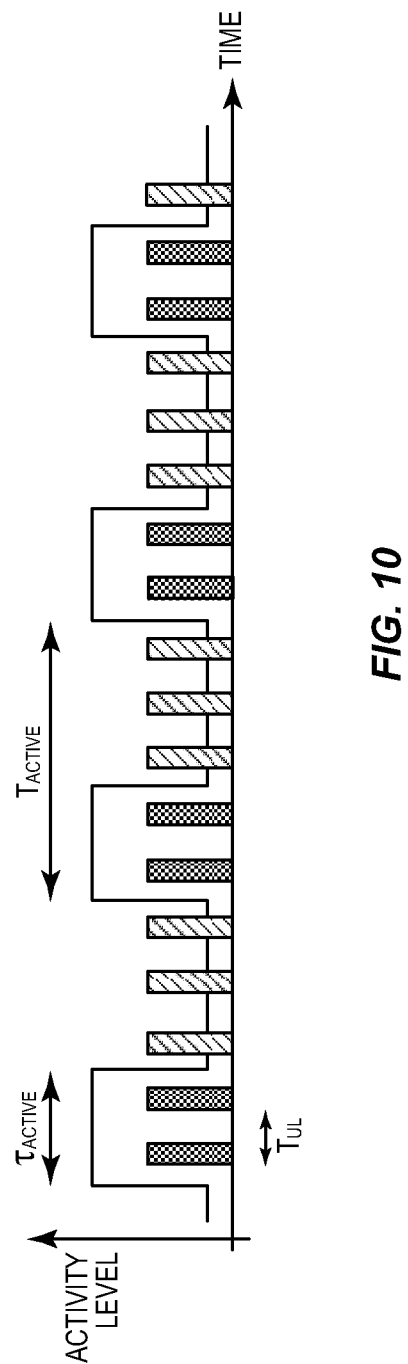
FIG. 10 is a timing diagram illustrating multiple UL radio signal transmission/measurement times during each active state in accordance with one embodiment.

In a more specific embodiment, the measurement time may be defined as $$t = T_{Active} \cdot \left(\frac{M}{n} - 1\right) + \Delta, \quad \text{Eq. 9}$$

for example, where n UL transmissions are required per active state time $\tau_{Active}$ (and thus, need to be configured/triggered by a network node and also transmitted by the transmitting node, as seen in FIG. 10. However, the eNodeB may need to configure/trigger a remaining number of necessary SRS by using aperiodic SRS, as seen in FIG. 11, for example, if periodic SRS are not sufficient per active state time $\tau_{Active}$.

Measurement Time for Two-Directional Measurements

In addition to the foregoing, aspects of the present disclosure provide a method for measuring time for two-directional measurements. In such cases, an UL measurement is a measurement involving an UL component (e.g., a measurement over a link over which the transmitting node is transmitting) and a DL component (e.g., a measurement over a link over which the transmitting node is receiving). Some examples are timing measurements over multifarious links, RTT, UE Rx-Tx, eNodeB Rx-Tx, and the like.

The low-activity state configuration may impact both DL and UL components, so the measurement time is a function of both downlink and uplink signal configurations. For example, the measurement time may be a function of the periodicity of UL signals but also of the periodicity of DL signals $$t = f(C_{LowActivity}, T_{UL}, T_{DL}), \quad \text{Eq. 10}$$

where in one example the function may depend on the maximum of $T_{UL}, T_{DL}$.

Power Control

Using low-activity state configuration in the transmitting node 30b may also impact power control procedures. For example, there may be a different power control loop, or the power control parameters may be configured differently, and/or the power control accuracy may be different. This may in turn impact the transmit power of the UL radio signal, and hence, also the received signal strength and quality of the UL radio signal at the measuring node 30a.

Therefore, some adaptation to the methods described herein may be needed at any one or more of the measuring node 30a, the transmitting node 30b, the configuring node 30c, and the network node, based on the information about low-activity states configuration. For example, as previously described, a measuring node 30a may adapt its measurement procedure or configuration when a different power control is used, when a different power control accuracy is required/targeted, or when a power back-off is used at the transmitting node 30b in relation to using low-activity states.

State Transition Between Using/not Using Low-activity States

There may be different requirements (e.g., any of the mentioned above) associated with cases when low-activity states are used and when low-activity states are not used. There may also be different requirements for different low-state activity configurations, which the transmitting node changes in time. The change of using/not using low-activity configurations or the change between two different low-activity state configurations may occur while UL measurements are performed by the measuring node. For example, the transition may be due to a cell change or a serving carrier change.

Therefore, in one embodiment, the information about low-activity state configuration may also comprise the information about the time when the change occurs or about the transition period which comprises the time when the change occurs.

The adaptation in the relevant nodes (e.g., any one or more of the measuring node 30a, the transmitting node 30b, the configuring node 30c, and the network node) may therefore be performed.

In one embodiment, the adaptation may be associated with a transition period, which may occur during the UL measurement time. The transition period may also be limited in time.

In another embodiment, the transition/adaptation may be not allowed during a valid UL measurement. This may imply, for example, that:

a UL measurement may be considered as best-effort, invalid or an error may be reported if the transition occurs during the measurement; or the transition may be postponed until the UL measurement is complete and/or reported; or if configured, the transition may be cancelled or ignored, at least until the UL measurement is complete and/or reported; or the transition cannot be configured (e.g., configuring node shall not configure) during the UL measurement; or the UL measurement may be postponed until after the transition is complete; or the UL measurement is restarted after the transition is complete; or the UL measurement time may be extended so that the measurement is temporarily not performed during the transition but then continue after the transition is complete.

In another embodiment, the UL measurement may continue if the transition occurs. However, a different level of requirement and/or different set of requirements may apply for a UL measurement during which transition occurred compared to when no transition occurred. Further, only one of the low-activity state configurations is used. In one embodiment, when the transition occurs, the least stringent requirement (e.g., longest time, lowest accuracy, largest power adjustment step, and the like) may apply for the entire UL measurement.

The system and method of the present disclosure provide benefits and advantages not realized with conventional methods. Particularly, the methods of the present disclosure provide an improved UL measurement performance due to avoiding or reducing the need to blindly detect configured UL signals that may be not transmitted due to low-activity state configuration. Additionally, the embodiments described herein make it possible to comply with a pre-defined requirement and thereby control the UL measurement performance, even when the transmitting node is using low-activity states. Moreover, the embodiments adaptively configure UL radio signals and low-activity states to achieve a desired UL measurement quality characteristic or requirement.

Figure 12:
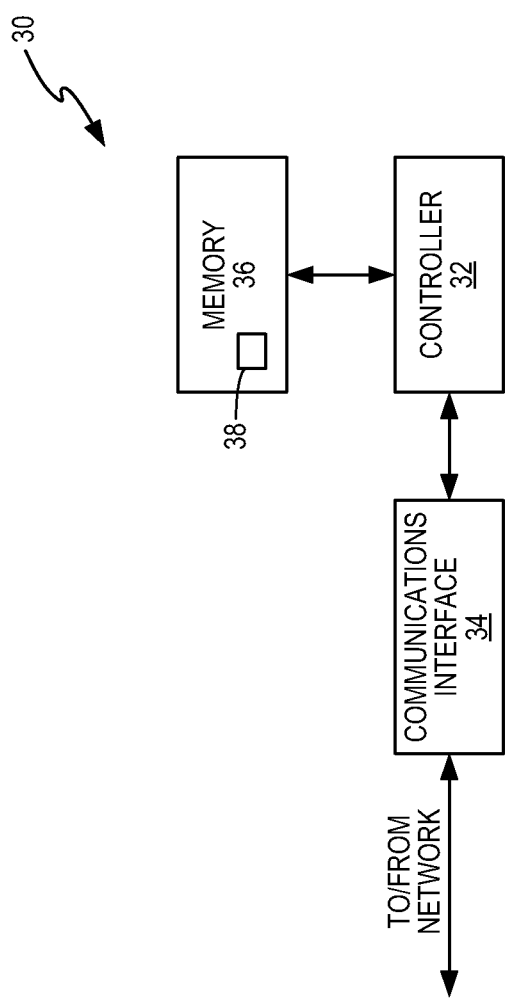
FIG. 12 is a block diagram illustrating some component parts of a node configured to perform the methods in accordance with one or more embodiments.

FIG. 12 illustrates an exemplary node 30 configured to perform the method according to one or more of the previously described embodiments. Node 30 may be, for example, any of the configuring node 30c, the transmitting node 30b, the measuring node 30a, the network node, or any other node capable of performing any of the previously described embodiments.

As shown in FIG. 12, node 30 comprises at least a programmable controller (i.e., a processing circuit) 32, a communications interface circuit 34, and a memory circuit 36. The communications interface circuit 34 may, for example, comprise a transmitter and receiver, or other interface, configured to operate in an LTE system or other similar system. As is known in the art, the communications interface circuit 34 may be coupled to one or more antennas (not shown) and communicate with a UE and other such devices over the LTE-based air interface, or it may be coupled to another interface that allows node 30 to communicate data and information with other nodes in the network. Memory circuit 36 may comprise any solid state memory or computer readable media known in the art. Suitable examples of such media include, but are not limited to, ROM, DRAM, Flash, or a device capable of reading computer-readable media, such as optical or magnetic media. The programmable controller circuit 32 controls the operation of the node 30 in accordance with known standards. The functions of the controller circuit 32 may be implemented by one or more microprocessors, hardware, firmware, or a combination thereof, and include performing the functions and methods described herein in accordance with logic and instructions 38 stored in the memory circuit 36.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

ABBREVIATIONS

3GPP 3$^{rd}$ Generation Partnership Project
BS Base Station
CRS Cell-specific Reference Signal
DL Downlink
eNodeB evolved Node B
E-SMLC Evolved SMLC
IE Information Element
LTE Long-Term Evolution
MDT Minimization of Drive Tests
PCI Physical Cell Identity
RF Radio Frequency
RRC Radio Resource Control
RSRP Reference Signal Received Power
RSRQ Reference Signal Received Quality
RSSI Received Signal Strength Indicator
SINR Signal-to-Interference Ratio
SON Self-Optimized Network
SRS Sounding Reference Signals
UE User Equipment
UL Uplink
UMTS Universal Mobile Telecommunications System
UTDOA UL Time Difference of Arrival

What is claimed is:

1. A method performed at a measuring node configured to adapt its uplink (UL) measurements responsive to information about a low-activity state configuration of a transmitting node, the method comprising:
    obtaining information about the low-activity state configuration of the transmitting node, wherein the obtaining comprises determining the information based on a received measurement and/or a received measurement report associated with the transmitting node, and the low-activity state configuration comprises one or both of a Discontinuous Reception (DRX) configuration and a Discontinuous Transmission (DTX) configuration of the transmitting node; and
    performing at least one UL measurement using the obtained information, wherein performing the at least one UL measurement comprises measuring on UL radio signals transmitted by the transmitting node.

2. The method of claim 1 wherein obtaining information about the low-activity state of the transmitting node further comprises determining whether the UL radio signals on which the at least one UL measurement is made are impacted by the low-activity state configuration based on:
    a pre-defined rule or requirement;
    a configuration of the transmitting node received from the transmitting node;
    configuration data received from another network node; and/or
    the information about the low-activity state configuration.

3. The method of claim 1 wherein obtaining information about the low-activity state of the transmitting node further comprises receiving from another node, or from a higher protocol layer, an indicator that indicates
    whether a specified type of UL radio signal is prevented from being transmitted by the transmitting node due to low-activity periods;
    whether the transmitting node, as configured, transmits the specified type of UL radio signal;
    whether the transmitting node is configurable to transmit the specified type of UL signal; and/or
    whether the transmitting node will transmit a predetermined number of UL radio signal transmissions, regardless of whether low-activity states are used.

4. The method of claim 1 wherein obtaining information about the low-activity state of the transmitting node further comprises receiving:
    an actual low-activity state configuration of the transmitting node;
    one or more possible low-activity state configurations of the transmitting node;

a common low-activity configuration of the transmitting node usable by a group of wireless devices in a cell, or all of the wireless devices in the cell;

a pattern or a map indicating a subset of one or both of configured signals and time instances that are transmitted by the transmitting node regardless of whether the transmitting node is configured to operate in a low-activity state; and/or measurement scheduling information associated with an activity of the transmitting node.

5. The method of claim 1 wherein obtaining information about the low-activity state of the transmitting node further comprises autonomously discovering the low-activity state of the transmitting node by detecting the configured UL radio signals transmitted by the transmitting node.

6. A measuring node configured to adapt its uplink (UL) measurements responsive to information about a low-activity state configuration of a transmitting node, the measuring node comprising:

a communications interface configured to receive a measurement and/or measurement report associated with the transmitting node; and a processing circuit communicatively coupled to the communications interface, wherein the processing circuit is configured to:

obtain the information about the low-activity state configuration of the transmitting node by determining the information based on the received measurement and/or measurement report associated with the transmitting node, wherein the low-activity state configuration comprises one or both of a Discontinuous Reception (DRX) configuration and a Discontinuous Transmission (DTX) configuration of the transmitting node; and perform at least one UL measurement using the obtained information by measuring on UL radio signals transmitted by the transmitting node.

7. The measuring node of claim 6 wherein the measuring node is comprised in a node that is other than a base station serving the transmitting node.

8. The measuring node of claim 6 wherein to obtain the information about the low-activity state of the transmitting node, the processing circuit is further configured to determine whether the UL radio signals on which the at least one UL measurement is made are impacted by the low-activity state configuration based on:

a pre-defined rule or requirement;

a configuration of the transmitting node received from the transmitting node; and/or the information about the low-activity state configuration of the transmitting node.

9. The measuring node of claim 6 wherein to obtain the information about the low-activity state of the transmitting node, the processing circuit is further configured to receive via the communications interface an indicator that indicates:

whether a specified type of UL radio signal is prevented from being transmitted by the transmitting node due to low-activity periods;

whether the transmitting node, as configured, transmits the specified type of UL radio signal;

whether the transmitting node is configurable to transmit the specified type of UL signal; and/or whether the transmitting node will transmit a predetermined number of UL radio signal transmissions, regardless of whether low-activity states are used.

10. The measuring node of claim 6 wherein to obtain the information about the low-activity state of the transmitting node, the processing circuit is further configured to receive via the communications interface:

an actual low-activity state configuration of the transmitting node;

one or more possible low-activity state configurations of the transmitting node;

a common low-activity configuration of the transmitting node usable by a group of wireless devices in a cell, or all of the wireless devices in the cell;

a pattern or a map indicating a subset of one or both of configured signals and time instances that are transmitted by the transmitting node regardless of whether the transmitting node is configured to operate in a low-activity state; and/or measurement scheduling information associated with an activity of the transmitting node.

11. The measuring node of claim 6 wherein to obtain the information about the low-activity state of the transmitting node, the processing circuit is further configured to autonomously discover the low-activity state of the transmitting node by detecting the configured UL radio signals transmitted by the transmitting node.

12. The measuring node of claim 7, wherein the node comprising the measuring node is a different base station than the base station serving the transmitting node.

13. The method of claim 1, wherein the measuring node is comprised in a node that is other than a base station serving the transmitting node.

14. The method of claim 13, wherein the node comprising the measuring node is a different base station than the base station serving the transmitting node.

* * * * *